US009195381B2

(12) United States Patent
Nakamura

(10) Patent No.: US 9,195,381 B2
(45) Date of Patent: Nov. 24, 2015

(54) INFORMATION PROCESSING APPARATUS, METHOD FOR CONTROLLING THE SAME, AND STORAGE MEDIUM TO RECEIVE A TOUCH OPERATION FOR ROTATING A DISPLAYED IMAGE

(71) Applicant: CANON KABUSHIKI KAISHA, Tokyo (JP)

(72) Inventor: Tomonori Nakamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 163 days.

(21) Appl. No.: 13/860,207

(22) Filed: Apr. 10, 2013

(65) Prior Publication Data

US 2013/0271430 A1   Oct. 17, 2013

(30) Foreign Application Priority Data

Apr. 13, 2012 (JP) ................................. 2012-092213

(51) Int. Cl.
  *G06F 3/0484* (2013.01)
  *G06F 3/0488* (2013.01)
(52) U.S. Cl.
  CPC ........ *G06F 3/04845* (2013.01); *G06F 3/04883* (2013.01)

(58) Field of Classification Search
  CPC ............ G06F 3/04833; G06F 3/04845; G06F 3/04838
  USPC .......................................................... 345/173
  See application file for complete search history.

(56) References Cited

U.S. PATENT DOCUMENTS

| 2008/0165141 | A1* | 7/2008 | Christie ........................ 345/173 |
| 2009/0184939 | A1* | 7/2009 | Wohlstadter et al. ......... 345/173 |
| 2012/0200604 | A1* | 8/2012 | Imaeda et al. ................ 345/650 |

FOREIGN PATENT DOCUMENTS

| CN | 201181467 Y | 1/2009 |
| JP | 2008-217767 A | 9/2008 |
| JP | 2011-014169 A | 1/2011 |
| WO | 2011045861 A1 | 4/2011 |
| WO | WO 2011045861 A1 * | 4/2011 |

* cited by examiner

*Primary Examiner* — Allison Johnson
(74) *Attorney, Agent, or Firm* — Canon USA Inc. IP Division

(57) ABSTRACT

An information processing apparatus acquires an angle between a straight line determined by two touch points at a first time point and a straight line determined by two touch points at a second time point, sets an angular threshold value based on a distance between the two touch points at the first time point, and receives an operational input performed with the two touch points as a predetermined operation if the acquired angle is greater than the set angular threshold value.

11 Claims, 15 Drawing Sheets

FIG. 4A

| DETECTION NUMBER | EVENT NAME | x COORDINATE | y COORDINATE | ID |
|---|---|---|---|---|
| 1 | DOWN | 50 | 150 | 0 |
| 2 | DOWN | 250 | 150 | 1 |
| 3 | MOVE | 52 | 133 | 0 |
| 4 | MOVE | 249 | 167 | 1 |
| 5 | MOVE | 56 | 116 | 0 |
| 6 | MOVE | 244 | 184 | 1 |

FIG. 4B

| DISTANCE D (dot) | ANGLE (deg) |
|---|---|
| D < 250 | 20 |
| 250 ≤ D < 500 | 10 |
| 500 ≤ D | 5 |

FIG. 4C

| DISTANCE D (dot) | ANGLE (deg) |
|---|---|
| D < 125 | 20 |
| 125 ≤ D < 250 | 10 |
| 250 ≤ D | 5 |

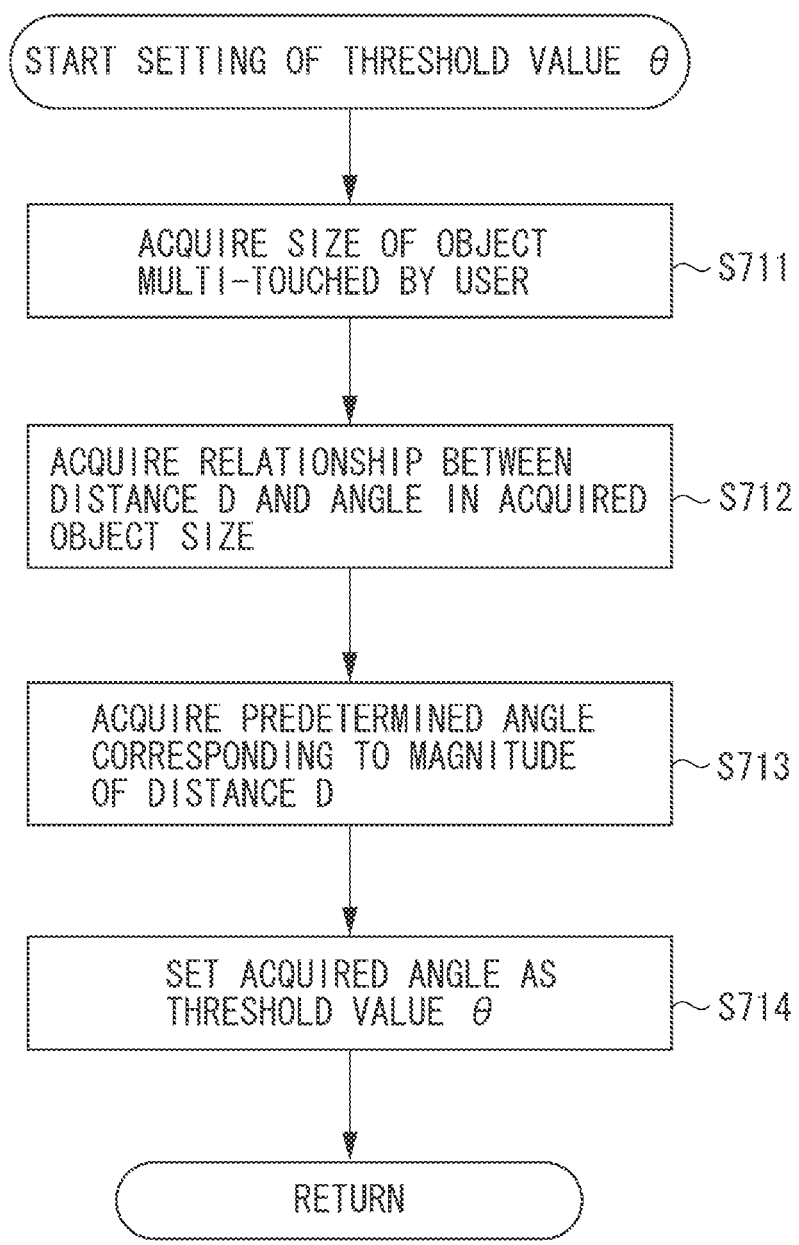

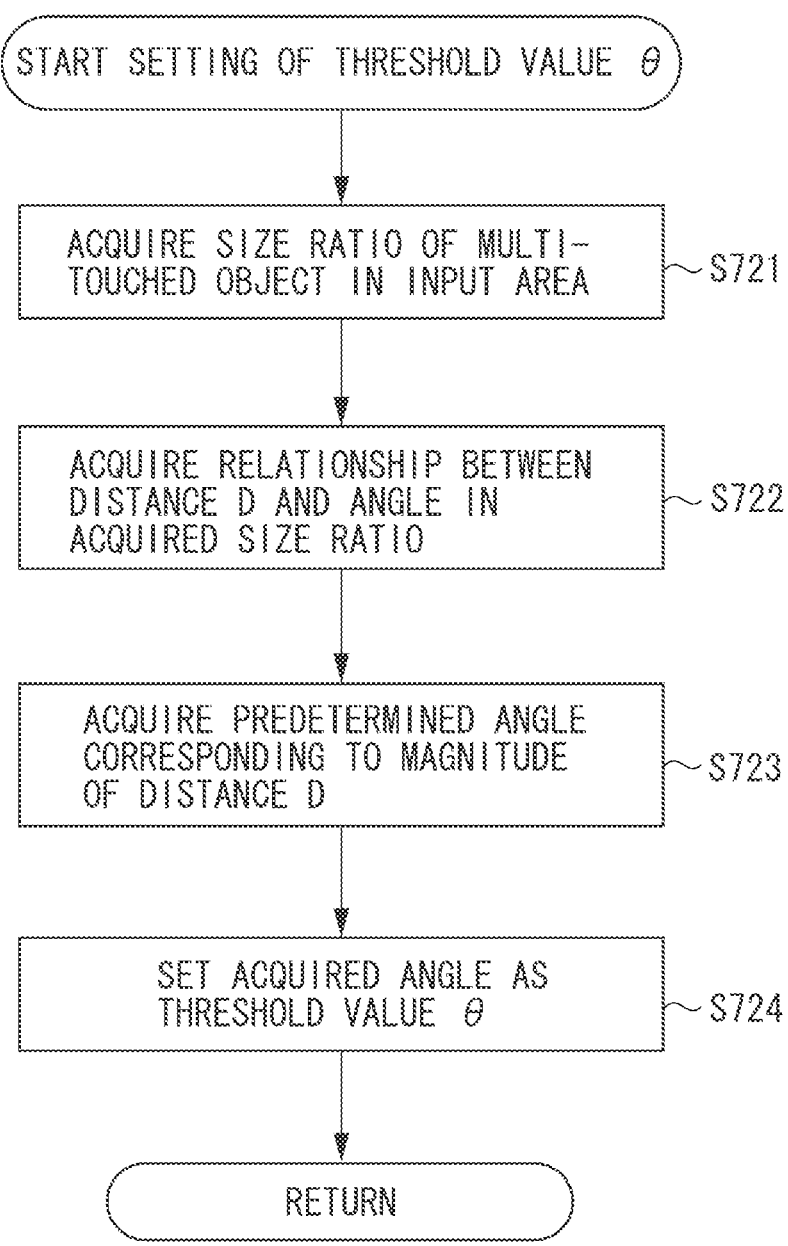

INFORMATION PROCESSING APPARATUS, METHOD FOR CONTROLLING THE SAME, AND STORAGE MEDIUM TO RECEIVE A TOUCH OPERATION FOR ROTATING A DISPLAYED IMAGE

BACKGROUND OF THE INVENTION

1. Field of the Invention

The present disclosure relates to a technique that can recognize a multi-touch operation input by a user.

2. Description of the Related Art

It is conventionally known to detect a plurality of points on an apparatus surface that are simultaneously touched with fingers or styluses and to operate the apparatus based on temporal changes in a plurality of coordinate values of the detected points. In the present disclosure, the above-mentioned technique is referred to as a "multi-touch operation."

A "rotational operation" is a representative multi-touch operation, which is generally used to cause an object (e.g., an image or a map) displayed on a display unit to rotate around its rotational axis.

As discussed in Japanese Patent Application Laid-Open No. 2011-14169, it is conventionally known to acquire an angle between a line connecting touch points at movement start timing and a line connecting the same touch points at movement completion timing and to identify a rotational operation performed with two instruction positions (i.e., touch points) based on the acquired angle.

However, the angle of a straight line connecting a plurality of touch points may unintentionally change in response to a positional shift of a touch point even when a user does not intend to rotate a displayed object. In such a case, if the movement of a touch point is erroneously recognized as an input of the rotational operation, the apparatus causes the displayed object to rotate around its rotational axis contrary to the user's intent.

SUMMARY OF THE INVENTION

The present disclosure is directed to an apparatus that can prevent a multi-touch operation from being erroneously performed contrary to the user's intent.

According to an aspect of the present disclosure, an information processing apparatus is configured to allow a touch operation thereon. The information processing apparatus includes an acquisition unit configured to acquire an angle between a straight line determined by two touch points at a first time point and a straight line determined by two touch points at a second time point, a setting unit configured to set an angular threshold value based on a distance between the two touch points at the first time point, and a reception unit configured to receive an operational input performed with the two touch points as a predetermined operation if the angle acquired by the acquisition unit is greater than the angular threshold value set by the setting unit.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

FIGS. 4A, 4B, and 4C are information management tables usable for the information processing apparatus.

FIGS. 7A, 7B, 7C, and 7D are flowcharts each illustrating an example of angular threshold value setting processing that can be performed by the information processing apparatus.

DESCRIPTION OF THE EMBODIMENTS

Figure 1A:
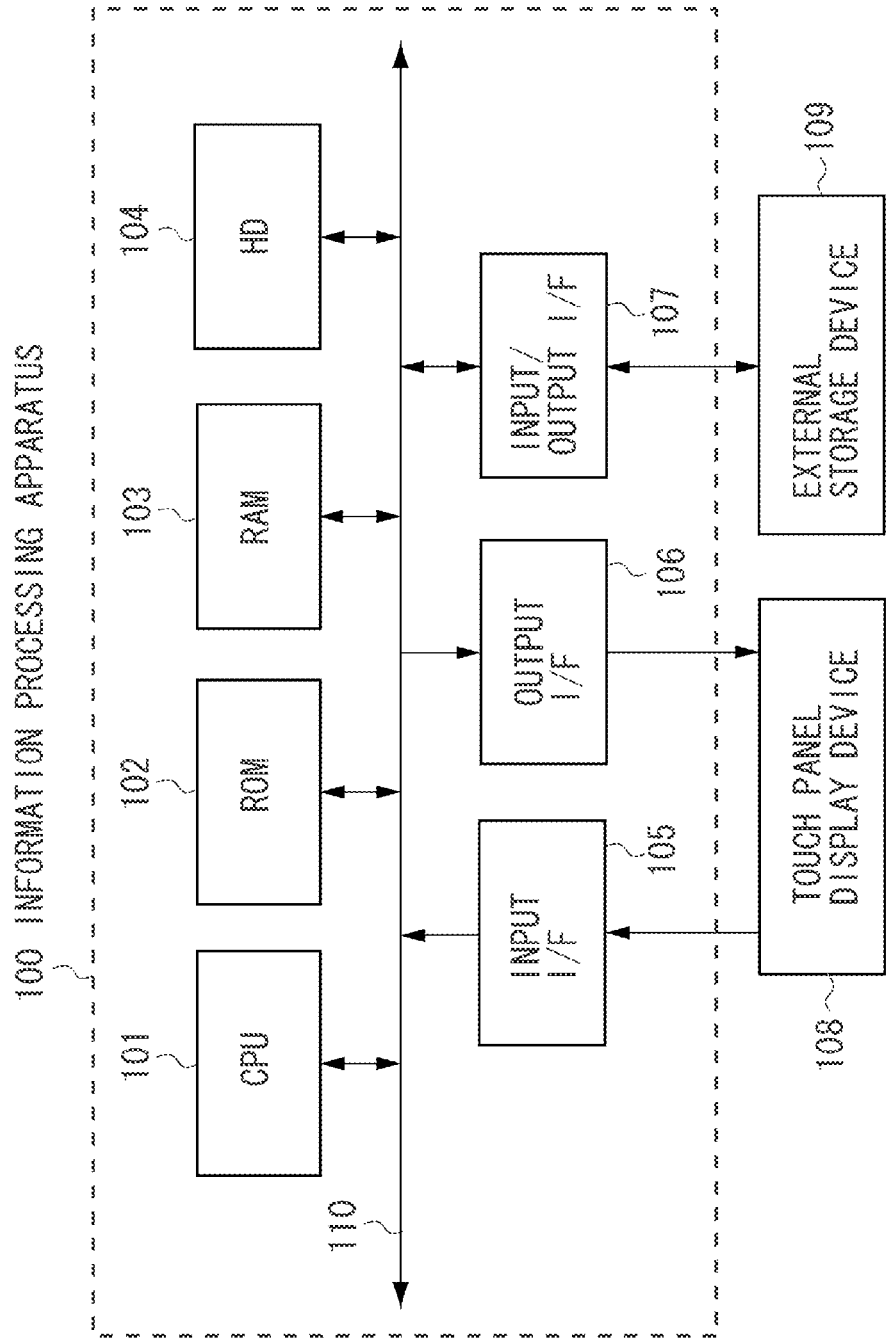
FIG. 1A is a block diagram illustrating a hardware configuration of an information processing apparatus and FIG. 1B is a block diagram illustrating a functional configuration of the information processing apparatus.

Various exemplary embodiments, features, and aspects of the disclosure will be described in detail below with reference to the drawings.

Constituent components described in the following exemplary embodiments are mere examples, and the scope of the present disclosure is not narrowly restricted to these embodiments and various modifications are allowed in a range within the scope thereof.

An information processing apparatus according to a first exemplary embodiment can detect a multi-touch operation performed by a user with two fingers when two touch points are detected simultaneously. Further, the information processing apparatus sets an angular threshold value based on a distance between two detected touch points. In a case where a straight line connecting the touch points inclines when at least one of the touch points moves, the information processing apparatus recognizes an input rotational operation if the rotational angle of the line exceeds the set angular threshold value. More specifically, the angular threshold value is set to be larger if the distance between the touch points is shorter, compared to the value to be set when the distance between touch points is longer. Thus, when the user does not intend to rotate a displayed image, the information processing apparatus according to the first exemplary embodiment can prevent the currently displayed image from rotating around its axis contrary to the intent of the user regardless of the distance between touch points.

A general rotational operation recognition method is described below. It is now presumed that a touch point A and a touch point B have been detected at time T, and the two touch points A and B are detected as a touch point A' and a touch point B' at later time T' after at least one of the two touch points A and B has moved. The rotational operation recognition method includes comparing an angle α between a straight line AB and a straight line A'B' with a predetermined angular threshold value θ, and recognizing an input rotational operation if the angle α is equal to or greater than the threshold value θ. Providing the angular threshold value as mentioned above is useful to prevent a tiny angular change, if it occurs during a multi-touch operation not intending to rotate a displayed image, from being erroneously recognized as an input of a rotational operation. In a case where the angle α exceeds the threshold value θ, a movement of the touch point A (i.e., the magnitude of a straight line AA') or a movement of the touch point B (i.e., the magnitude of a straight line BB') is large if the magnitude of the distance AB is long and is small if the magnitude of the distance AB is short.

Accordingly, for example, when a user uses a forefinger and a middle finger to perform a multi-touch operation, the distance between two touch points cooperatively constituting the multi-touch operation is short. Therefore, even when a slight change occurs in a relative positional relationship between the two touch points, the magnitude of the angle α may exceed the threshold value θ.

However, it is generally difficult for the user to hold the relative positional relationship between the two touch points to prevent the currently displayed image from rotating. Further, a touch panel is not free from errors that may occur in the detection of contact points touched with user fingers and identifying coordinate values of the touch points. For example, a variation may occur in the coordinate values of the detected touch points even if the user tries to fix the fingers to hold the relative positional relationship thereof.

As mentioned above, especially when the distance between two touch points is short, there is the tendency of erroneously recognizing a rotational operation input to the apparatus even if a user does not intend to rotate a displayed object. Therefore, the information processing apparatus may perform an operation in a manner not intended by the user. Compared with this, the threshold value θ to be set in the present exemplary embodiment is an angle determined depending on the distance between two touch points touched by the user. More specifically, the information processing apparatus according to the present exemplary embodiment sets the threshold value θ to be a larger angle when the distance between two touch points is short, compared to the value to be set when the distance between two touch points is long. More specifically, when the distance between two touch points is a distance i that is shorter than a distance k, the angular threshold value to be set when the two touch points are spaced by the distance i is greater than the value to be set when the two touch points are spaced by the distance k. Thus, even when the distance between two touch points is short, the information processing apparatus according to the present exemplary embodiment does not perform a rotational operation in a manner not intended by the user.

FIG. 1A illustrates a hardware configuration of an information processing apparatus 100 according to the present exemplary embodiment. A central processing unit (CPU) 101 can perform calculations and logical determinations for various processing to be performed by constituent components connected to a system bus 110. The above-mentioned information processing apparatus 100 includes a plurality of memories. A read only memory (ROM) 102 is a program memory, which stores control programs to be executed by the CPU 101 to perform various processing. A random access memory (RAM) 103 is a data memory, which includes a work area usable when the CPU 101 executes the above-mentioned programs, a data saving area for backup in error processing, and a loading area for the above-mentioned control programs. Alternatively, the program memory can be realized by loading a program into the RAM 103 from an external storage device 109. A hard disk drive (HD) 104 is a device that can store data and programs to be processed or executed according to the present exemplary embodiment. In the present exemplary embodiment, it is presumed that a plurality of pieces of image data is stored in the HD 104. The external storage device 109, which is connected to the CPU 101 via an input/output interface 107, is functionally operable as a storage medium comparable to the HD 104. In the present exemplary embodiment, the external storage device 109 includes an external storage drive that realizes an access to a recording medium. The above-mentioned recording medium is, for example, a flexible disk (FD), a compact disc read only memory (CD-ROM), a digital versatile disc (DVD), a universal serial bus (USB) memory, a magneto-optical (MO) disk, or a flash memory. Further, a server apparatus accessible via a network is operable as the external storage device 109. Information necessary in the present exemplary embodiment can be stored in the RAM 103, the HD 104, or the external storage device 109. An input interface 105 controls an input apparatus (e.g., a pointing device) and acquires an input signal input to the information processing apparatus 100 to recognize a touch operation. The input interface 105 sends a touch notification to the system. An output interface 106 outputs a signal, which controls the output of each processing result, to an output apparatus that includes a display unit (e.g., a liquid crystal display device or a television monitor). A touch panel display device 108 employed in the present exemplary embodiment is integrated with the information processing apparatus 100. The touch panel display device 108 includes a touch panel (i.e., the input apparatus) and a display device (i.e., the output apparatus). However, the touch panel display device 108 can be replaced by any other external apparatus connectable to the information processing apparatus 100. The input apparatus and the output apparatus can be configured to be independent from each other. The touch panel employed in the present exemplary embodiment is an electrostatic capacitive panel, which can identify coordinate values of a point, when touched by a user, as a touch point on a touch surface of the panel. However, the type of the touch panel is not limited to the electrostatic capacitive type.

Figure 1B:
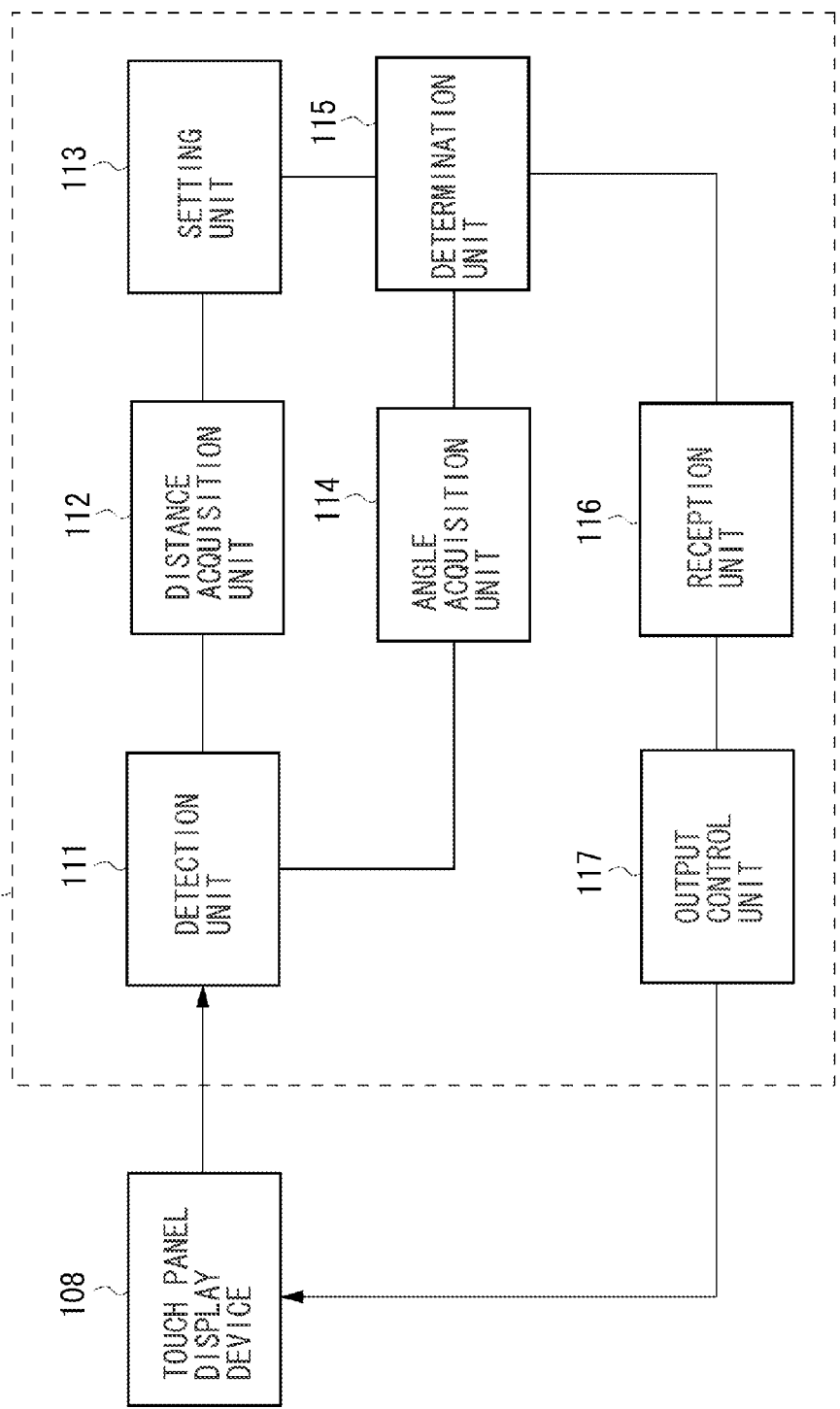

FIG. 1B is a block diagram illustrating a functional configuration of the information processing apparatus 100 according to the present exemplary embodiment. A detection unit 111, which can be constituted by the CPU 101, the ROM 102, and the RAM 103, detects information relating to each touch point touched by a user, based on a signal notified via the input interface 105, in the present exemplary embodiment. In the present exemplary embodiment, the input interface 105 refers to information relating to a plurality of touch points detected by the touch panel (i.e., the input apparatus) at predetermined intervals and sends a notification signal to the detection unit 111 each time information about one touch point is acquired. The touch point related information includes, for example, coordinate information indicating the position of each touch point, type of each touch event, and identification information (ID) allocated to each touch point. In this case, it is useful that the ID to be allocated to each touch point is associated with a serial number in the order of detection because of easiness in management of a plurality of touch points. In the present exemplary embodiment, the touch event that can be notified via the input interface 105 is any one of three types, "DOWN", "MOVE", and "UP." More specifically, "DOWN" indicates a start of a touch operation, "MOVE" indicates a movement of a finger (or a stylus) that is kept in a touched state, and "UP" indicates a cancellation of the touch operation. If a plurality of touch points constituting a sequential locus ranging from the start to the termination of the touch operation is detected, the same ID is allocated to these touch points. The detection unit 111 stores the detected touch point related information in the RAM 103.

A distance acquisition unit 112, which can be constituted by the CPU 101, the ROM 102, and the RAM 103, acquires a distance between touch points based on the touch point related information detected by the detection unit 111 and stored in the RAM 103 and then stores the acquired the distance in the RAM 103.

A setting unit 113, which can be constituted by the CPU 101, the ROM 102, and the RAM 103, sets a threshold value to be used in a determination unit 115 based on the touch point distance acquired by the distance acquisition unit 112 and stored in the RAM 103 and then stores the set threshold value in the RAM 103.

An angle acquisition unit 114, which can be constituted by the CPU 101, the ROM 102, and the RAM 103, acquires a rotational angle of a touch point that is rotated by a user based on positional information of a plurality of touch points before and after the movement detected by the detection unit 111 and stored in the RAM 103, and then stores the acquired angle in the RAM 103.

The determination unit 115, which can be constituted by the CPU 101, the ROM 102, and the RAM 103, determines whether a predetermined operation has been input based on a comparison between the angle acquired by the angle acquisition unit 114 and stored in the RAM 103 and the threshold value set by the setting unit 113 and stored in the RAM 103.

A reception unit 116, which can be constituted by the CPU 101, the ROM 102, and the RAM 103, receives the predetermined operation input to the information processing apparatus 100 based on a determination result obtained by the determination unit 115 and then sends a reception notification to an output control unit 117. In the present exemplary embodiment, the predetermined operation that can be received by the reception unit 116 is an operation that causes an image displayed on the touch panel display device 108 to rotate around its rotational axis.

The output control unit 117, which can be constituted by the CPU 101, the ROM 102, and the RAM 103, controls an output related unit to output a result of the multi-touch operation input by a user.

Figure 2:
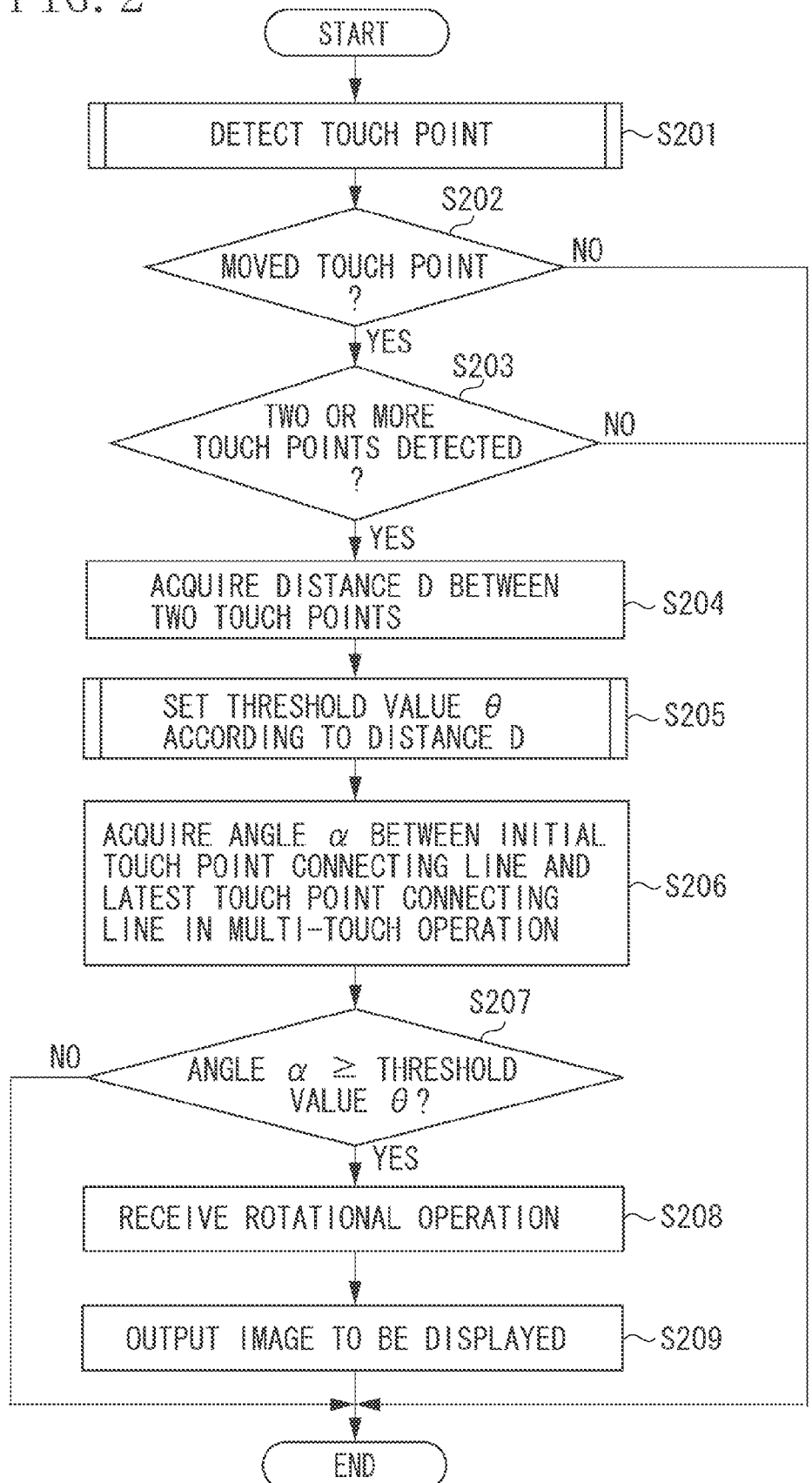
FIG. 2 is a flowchart illustrating multi-touch operation recognizing processing that can be performed by the information processing apparatus.

FIG. 2 is a flowchart illustrating an example of multi-touch operation recognizing processing that can be performed by the information processing apparatus 100. In the present exemplary embodiment, the information processing apparatus 100 launches the processing of the flowchart illustrated in FIG. 2 in response to a notification of information indicating detection of a touch point from the input interface 105, for example, when a user has newly touched the touch panel or has moved a touched finger (or stylus). Further, the information processing apparatus 100 can launch the processing of the flowchart illustrated in FIG. 2 in response to a notification of information indicating a cancellation of the touch operation from the input interface 105, for example, when the detected touch point is no longer detected.

First, in step S201, the detection unit 111 detects a touch point. The detection unit 111 acquires touch point related information notified from the input interface 105 based on information detected by the touch panel. Further, the detection unit 111 classifies the touch point related information (e.g., touch point position coordinates and touch event type) in association with an ID (i.e., information allocated to each touch point). Example touch point detection processing according to the present exemplary embodiment is described in detail below.

In step S202, the distance acquisition unit 112 determines whether the detected touch point is a moved touch point. More specifically, the distance acquisition unit 112 refers to the touch point related information, which has been detected by the detection unit 111 and stored in the RAM 103, and determines whether the position of the touch point detected in step S201 is different from the previously detected touch point position. In the present exemplary embodiment, the information stored in the RAM 103 includes touch event information. Therefore, if the touch event of the touch point detected in step S201 is MOVE, it indicates that the detected touch point is the moved touch point. If it is determined that the detected touch point is the moved touch point (YES in step S202), the operation proceeds to step S203. On the other hand, if the detected touch point is not the moved touch point, more specifically, when a newly touched point is detected, or when cancellation of the touch operation is detected (NO in step S202), the information processing apparatus 100 terminates the multi-touch operation recognizing processing of the flowchart illustrated in FIG. 2.

In step S203, the distance acquisition unit 112 determines whether a plurality of touch points is detected. The distance acquisition unit 112 refers to the touch point related information, which has been detected by the detection unit 111 and stored in the RAM 103, and determines whether the information stored in the RAM 103 includes a plurality of IDs allocated to respective touch points. In the present exemplary embodiment, the ID allocated to each of a plurality of touch points is stored in the RAM 103. Therefore, if a plurality of IDs is stored in the RAM 103, it means that a plurality of touch points has been detected by the detection unit 111. If the distance acquisition unit 112 determines that two or more touch points have been detected (YES in step S203), the operation proceeds to step S204. On the other hand, if the distance acquisition unit 112 determines that only one touch point is detected (NO in step S203), the information processing apparatus 100 terminates the multi-touch operation recognizing processing of the flowchart illustrated in FIG. 2.

In step S204, the distance acquisition unit 112 acquires a distance D between two touch points. In the present exemplary embodiment, the distance acquisition unit 112 obtains the touch point distance D based on the Pythagorean theorem with reference to coordinate information indicating the latest positions of a plurality of detected touch points.

In step S205, the setting unit 113 sets an angular threshold value θ according to the acquired distance D between two touch points. More specifically, when the touch point distance D is short, the angular threshold value θ to be set by the setting unit 113 is larger than the value to be set when the touch point distance D is long. The processing to be executed in step S205 is described in detail below.

In step S206, the angle acquisition unit 114 acquires an angle α between a straight line connecting the touch points at the multi-touch start timing and a straight line connecting the latest touch points. In the present exemplary embodiment, the RAM 103 stores positional information indicating a locus of a touch point that continuously contacts the touch panel, together with initially detected positional information, each time a movement is detected by the detection unit 111. Accordingly, the angle acquisition unit 114 acquires a straight line connecting two touch points before movement based on positional information of each touch point, at the time when a touch point having an ID identical to that of the touch point detected by the detection unit 111 in step S201 is initially detected (i.e., a first time point). Next, the angle acquisition unit 114 acquires a straight line connecting the touch points after movement based on positional information of each touch point, at the time when the touch point is lastly detected by the detection unit 111 in step S201 (i.e., a second time point). Then, the angle acquisition unit 114 acquires the angle α between the touch point connecting line obtained at the first time point and the touch point connecting line obtained at the second time point. In the present exemplary embodiment, the angle acquisition unit 114 obtains a first angle that indicates an angle of the line obtained at the first time point relative to a coordinate axis of the touch panel using a trigonometric function. Similarly, the angle acquisition unit 114 obtains a second angle that indicates an angle of the line obtained at the second time point. The angle acquisition unit 114 obtains a difference between the first angle and the second angle as the magnitude of the angle α.

Next, in step S207, the determination unit 115 determines whether the magnitude of the angle α is equal to or greater than the magnitude of the threshold value θ. The determination unit 115 refers to the angle α, which has been acquired by the angle acquisition unit 114 and stored in the RAM 103, and the threshold value θ, which has been set by the setting unit 113 and stored in the RAM 103. The determination unit 115 compares the magnitude of the angle α with the magnitude of the threshold value θ. If it is determined that the angle α is equal to or greater than the threshold value θ (YES in step S207), the operation proceeds to step S208. If it is determined that the angle α is less than the threshold value θ (NO in step S207), the information processing apparatus 100 terminates the multi-touch operation recognizing processing of the flowchart illustrated in FIG. 2.

In step S208, the reception unit 116 receives the rotational operation input to the information processing apparatus 100 and sends a notification indicating a rotational amount of an object to be rotated (i.e., an image displayed on the touch panel display device 108) to the output control unit 117. The rotational amount that causes the image to rotate around its rotational axis depends on the angle α.

In step S209, the output control unit 117 generates an image to be displayed on the touch panel display device 108 and outputs the generated image to the touch panel display device 108. More specifically, when the rotational operation input to the information processing apparatus 100 is received in step S208, the output control unit 117 generates an image by rotating the image displayed on the touch panel display device 108 by an angle that corresponds to a movement amount of a touch point moved by a user, and outputs the generated image. After the image is output to the touch panel display device 108, the information processing apparatus 100 terminates the multi-touch operation recognizing processing to be performed in the present exemplary embodiment.

The method for obtaining the distance D between two touch points (in step S204) and the angle α between two line segments (in step S206) is not limited to the above-mentioned method. For example, it is useful that the information processing apparatus 100 stores unique values, which can be determined beforehand based on a positional relationship between two or more touch points.

In a case where a rotational operation and other multi-touch operation are received and the outputs are simultaneously returned, the determination unit 115 determines whether an operation that does not cause any rotation of the currently displayed image has been input before the image to be displayed is output in step S209. In this case, the determination unit 115 determines whether the movement of the touch point satisfies the conditions for recognizing the other multi-touch operation. The reception unit 116 receives the multi-touch operation based on the determination result, and notifies parameters necessary to update the displayed image beforehand. Performing the processing as mentioned above is useful to prevent a rotational operation not intended by a user from being erroneously recognized and appropriately output results when various types of multi-touch operations have been input.

Figure 3A:
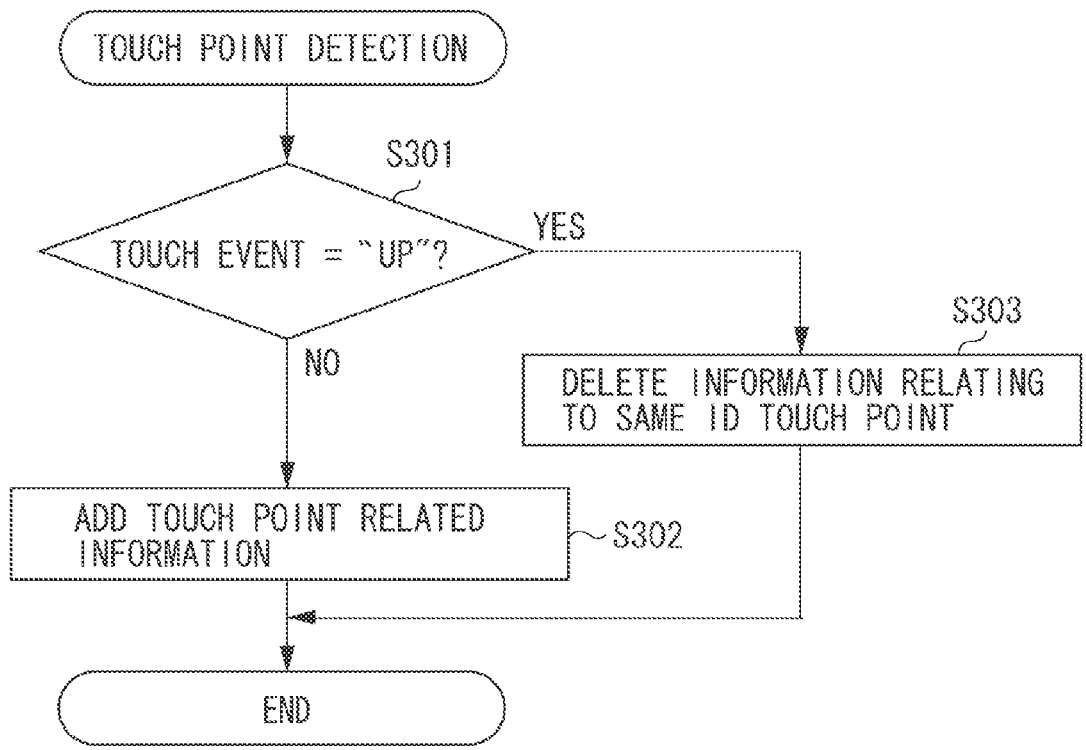
FIGS. 3A and 3B are flowcharts illustrating examples of processing that can be performed by the information processing apparatus.

FIG. 3A is an example of a flowchart illustrating details of the touch point detection processing to be executed in step S201 of the flowchart illustrated in FIG. 2. In the present exemplary embodiment, the touch event that can be notified via the input interface 105 is any one of three types, i.e., "DOWN" indicating a start of a touch operation by a user, "MOVE" indicating a movement of a finger (or a styluses) that is kept in a touched state, and "UP" indicating a cancellation of the touch operation.

In step S301, the detection unit 111 analyzes the notification signal received from the input interface 105 and determines whether the touch event is "UP." If it is determined that the touch event is not "UP" (NO in step S301), the operation proceeds to step S302, in which touch point related information is additionally stored.

FIG. 4A illustrates an example of a table that stores touch point related information detected by the detection unit 111 and stored in the RAM 103. In the table illustrated in FIG. 4A, detection numbers are stored in a field 401. In the present exemplary embodiment, the detection number is a serial number that represents the order of touch point detection. Each time touch point related information is newly detected, the detected information is added to the bottom of the table. The updated table is stored in the RAM 103. Further, it is useful to acquire touch point detection time and store the touch point related information according to the acquired time information in the RAM 103.

Further, touch event information, which is notified when each touch point is detected, is stored in a field 402. Accordingly, by referring to the items in the field 402, it is feasible to discriminate a newly detected touch point from a previously detected touch point having been moved. However, the method in this case is not limited to the touch event type storing method and can be replaced by any other method capable of storing information indicating whether the touch point is newly detected or previously detected. For example, it is useful to raise a movement flag only when the touch event is "MOVE."

An x-coordinate value and a y-coordinate value of each touch point, which can be defined in a coordinate plane applied to the entire touch detection area of the touch panel, are stored in a field 403 and a field 404, respectively.

Further, an ID (i.e., identification information allocated to each touch point) is stored in a field 405. In the present exemplary embodiment, the information processing apparatus 100 allocates ID=0 to an initially detected touch point and ID=1 to the next detected touch point. Similarly, the information processing apparatus 100 successively allocates a new ID (having a value incremented by 1) to a newly detected touch point every time the number of touch points, which are simultaneously detected by the touch panel, increases. The same ID is allocated to a plurality of touch points that constitute a locus of a specific moving point if these touch points continuously remain on the touch panel.

On the other hand, in the flowchart illustrated in FIG. 3A, if it is determined that the touch event is "UP" (YES in step S301), the operation proceeds to step S303. In step S303, the detection unit 111 deletes all of the information relating to the touch points whose ID is identical to that of the touch point whose touch event is "UP", of the touch point related information stored in the RAM 103.

In the present exemplary embodiment, the touch events that can be notified to the detection unit 111 are three types, i.e., "DOWN" indicating a start of a touch operation, "MOVE" indicating a movement of a touch point without cancellation, and "UP" indicating a cancellation of the touch operation. However, the type of the touch event is not limited to the above-mentioned types. For example, it is useful to notify a touch event "TOUCH" when a touch point that contacts the touch panel is detected. Further, it is useful to notify a touch event "RELEASE" when the touch operation is cancelled. In this case, if the touch event "RELEASE" is notified, the detection unit 111 deletes the touch point information from the RAM 103. If the type "TOUCH" is notified, the information processing apparatus 100 additionally stores touch point information in the RAM 103. Then, if any touch point having ID information identical to that of the already detected touch point is detected at a shifted position, the information processing apparatus 100 raises a movement flag (i.e., information indicating the detected movement of the touch point).

As mentioned above, in the present exemplary embodiment, the information processing apparatus 100 cumulatively stores information about repetitively detected touch points in the RAM 103 unless the touch operation is cancelled by the user. In this case, the information processing apparatus 100 can use all of the positional information including the initial position of a touched point and subsequent locus positions. On the other hand, in a case where the number of touch points is large, or when a user continues a touch operation for a long time, the amount of information stored in the RAM 103 may become larger. Therefore, the information processing apparatus 100 can delete older information when a movement of a touch point is detected. In other words, it is useful to store only the previous state information detected immediately before the touch point movement and the latest state information detected after the movement in the RAM 103. In this case, for example, if the determination in step S301 is NO, the information processing apparatus 100 determines whether the touch event is "DOWN." If it is determined that the touch event is "DOWN", the operation proceeds to step S302 in which touch point related information is additionally stored. Further, if the touch event is not "DOWN", more specifically if it is determined that the touch event is "MOVE", the information processing apparatus 100 stores only the information detected in the latest two detection operations while deleting the rest of the touch point related information having the same ID.

Figure 3B:
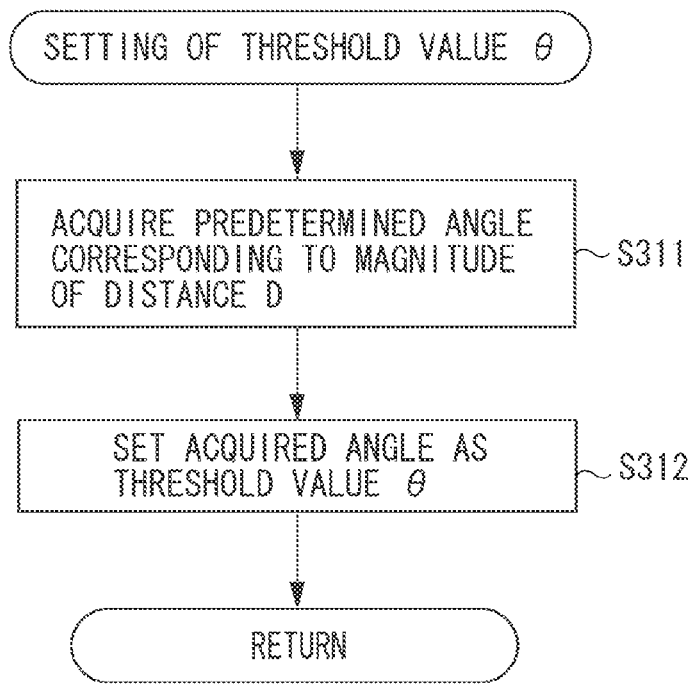

Next, FIG. 3B is an example of a flowchart illustrating details of the threshold value θ (i.e., the angle corresponding to the distance between two touch points) setting processing to be executed in step S205 of the flowchart illustrated in FIG. 2.

In step S311, the setting unit 113 acquires a predetermined angle associated with the magnitude of the distance D acquired by the distance acquisition unit 112 in step S204. FIG. 4B illustrates a table indicating an example of a relationship between the distance D and a corresponding angle.

In the table illustrated in FIG. 4B, some ranges with respect to the distance D (i.e., the distance acquired in step S204) are stored in a field 406. A predetermined angle corresponding to each range of the distance D is stored in a field 407. The table indicating the relationship between the magnitude of the distance D and the corresponding predetermined angle is stored beforehand in the HD 104 and can be loaded into the RAM 103 by the setting unit 113 and referred to. In this case, when the distance between two touch points is the distance i, the predetermined angle corresponding to the distance i is set to be greater than an angle to be set when the distance between two touch points is a distance k that is greater than the distance i. For example, as illustrated in FIG. 4B, the corresponding predetermined angle to be set when the distance D is 300 dots is 10 degrees, which is greater than 5 degrees, which is the corresponding predetermined angle to be set when the distance D is 500 dots.

In step S312, the setting unit 113 sets the angle acquired in step S311 as the threshold value θ. According to the above-mentioned processing, the angular threshold value to be set when the distance between two touch points is the distance i becomes greater than the angular threshold value to be set when the distance between two touch points is the distance k that is greater than the distance i. According to the above-mentioned setting, even if a straight line connecting two touch points causes a rotation in response to a tiny positional change of a touch point, the rotational angle of the line does not exceed the angular threshold value so easily because the angular threshold value is large when the distance between the touch points is small. Accordingly, the information processing apparatus 100 can reduce the possibility of erroneously recognizing an input of an unintended rotational operation. When the setting of the threshold value θ is completed, the operation returns to the main processing (i.e., user multi-touch operation recognizing processing).

As mentioned above, the information processing apparatus 100 performs the multi-touch operation recognizing processing according to the present exemplary embodiment. As mentioned above, in the present exemplary embodiment, the angular threshold value employed to determine whether a rotational operation has been input is a value set based on the distance between two or more touch points that constitutes a multi-touch operation. In this case, a threshold value to be set when the distance between touch points is small is larger than a threshold value to be set when the distance between touch points is large. Thus, regardless of the distance between two touch points, the information processing apparatus 100 can reduce the possibility of erroneously performing an operation for rotating a currently displayed image when a user does not intend to perform such a rotational operation.

In the present exemplary embodiment, a user operation for rotating an image displayed on the touch panel display device 108 is an example of the predetermined operation that can be received by the information processing apparatus 100. However, the predetermined operation is not limited to the above-mentioned example. For example, increasing and decreasing an output sound volume according to the rotational angle is another example of the predetermined operation. The operation can be an operation for increasing or decreasing a predetermined value according to an angle between a straight line determined by two touch points at the first time point and a straight line determined by the two touch points at a second time point. In this case, no displayed image is required. For example, it is useful to perform display control with a dial-like user interface component whose rotational angle is manually adjustable.

The system described in the present exemplary embodiment is not limited to an input operation using two touch points and is similarly applicable to an input operation using three or more touch points. In this case, it is useful to select proximate points or farthest points as an example method for extracting two of the three or more touch points. Further, for example, it is useful to set the threshold value θ based on a sum value or a mean value of touch-point distances between each of the three or more touch points and other touch point, and obtain the angle α based on the sum value or the mean value for the processing to be performed in the present exemplary embodiment.

An example operation according to the first exemplary embodiment is described below, in which a user inputs an instruction to the information processing apparatus 100 to cause a currently displayed image to rotate about its rotational axis.

FIGS. 5A, 5B, 5C, and 5D are graphs illustrating transitions of coordinate positions on an x-y plane, which indicate touch points detected when a user performs a multi-touch operation with a plurality of fingers on the information processing apparatus 100.

Figure 5A:
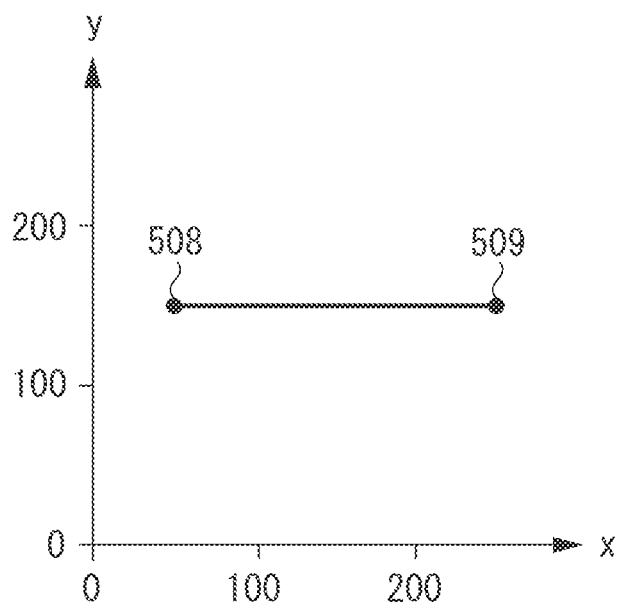
FIGS. 5A, 5B, 5C, and 5D are graphs illustrating transitions of touch points in a multi-touch operation performed by a user.

FIG. 5A illustrates a touch point 508 and a touch point 509 detected when the user touched the touch panel display device 108 with two fingers. Two touch points 508 and 509 correspond to the information of the detection numbers 1 and 2 stored in the table illustrated in FIG. 4A. More specifically, the detection number 1 is allocated to the touch point 508 when the touch point 508 is detected by the detection unit 111. More specifically, information representing the touch point 508 (i.e., touch event="DOWN", x coordinate=50, and y coordinate=150) is stored in the RAM 103 in association with ID information allocated to the touch point 508 (i.e., ID=0). Next, the detection number 2 is allocated to the touch point 509 when the touch point 509 is detected by the detection unit 111. Information representing the touch point 509 (i.e., touch event="DOWN", x coordinate=250, and y coordinate=150) is stored in the RAM 103 in association with ID information allocated to the touch point 509 (i.e., ID=1). The information processing apparatus 100 starts the processing of the flowchart illustrated in FIG. 2 at the time when the touch point 509 (detection number 2) has been detected. Therefore, the touch event is not "MOVE" at this moment and the determination result by the distance acquisition unit 112 in step S202 is NO. The information processing apparatus 100 terminates the multi-touch operation recognizing processing of the flowchart illustrated in FIG. 2.

Figure 5B:
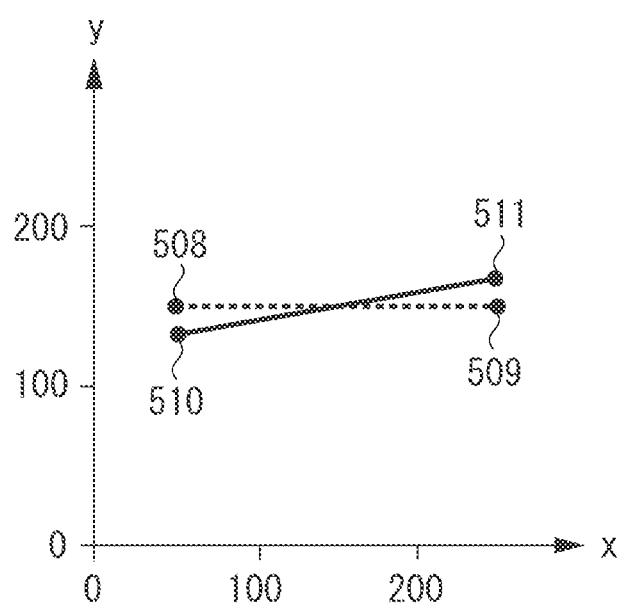

FIG. 5B illustrates a touch point 510 (ID=0) and a touch point 511 (ID=1) detected when the user has moved the touch point 508 and the touch point 509 with two fingers. Two touch points 510 and 511 correspond to the information of the detection numbers 3 and 4 stored in the table illustrated in FIG. 4A. The information processing apparatus 100 starts the processing of the flowchart illustrated in FIG. 2 at the time when the touch point 511 (detection number 4) has been detected, as described below.

First, in step S201, the detection unit 111 allocates the detection number 4 to the touch point 511 and stores information representing the touch point 511 (i.e., touch event="MOVE", x coordinate=249, and y coordinate=167) in association with ID=1. In this case, as the touch event is "MOVE", the touch point 511 is a touch point having been moved (YES in step S202). Therefore, the distance acquisition unit 112 determines that the detected touch points are a pair of touch points corresponding to ID=0 and ID=1 (YES in step S203). Next, in step S204, the distance acquisition unit 112 acquires the distance D between two touch points based on the coordinate information of the touch point 510 and the touch point 511. The distance D between two points can be obtained using the following formula, when the coordinate information of the first point is (x1, y1) and the coordinate information of the second point is (x2, y2).

$$X=\sqrt{\{(x1-x2)*(x1-x2)+(y1-y2)*(y1-y2)\}}$$

The distance D between the touch point 510 and the touch point 511 is 200 dots, which can be obtained by inputting coordinate values of these touch points to the above-mentioned formula. Next, in step S311, the setting unit 113 acquires a predetermined angle corresponding to the distance D with reference to the table illustrated in FIG. 4B stored beforehand. In this case, as the distance D is 200 dots, the setting unit 113 acquires 20 degrees as the predetermined angle corresponding to the distance D. Then, in step S312, the setting unit 113 sets the acquired angle of 20 degrees as the threshold value θ. Next, in step S206, the angle acquisition unit 114 acquires the angle α between a straight line connecting touch points at the multi-touch start timing (i.e., the touch point 508 and the touch point 509) and a straight line connecting the latest touch points (i.e., the touch point 510 and the touch point 511). The angle α can be calculated using the trigonometric function based on coordinate values of each touch point. In the example illustrated in FIGS. 5A to 5D, it is presumed that the angle α is 10 degrees. Therefore, the determination unit 115 determines that the angle α (i.e., 10 degrees) is less the threshold value θ (i.e., 20 degrees) (NO in step S207), the information processing apparatus 100 terminates the multi-touch operation recognizing processing of the flowchart illustrated in FIG. 2.

Figure 5C:
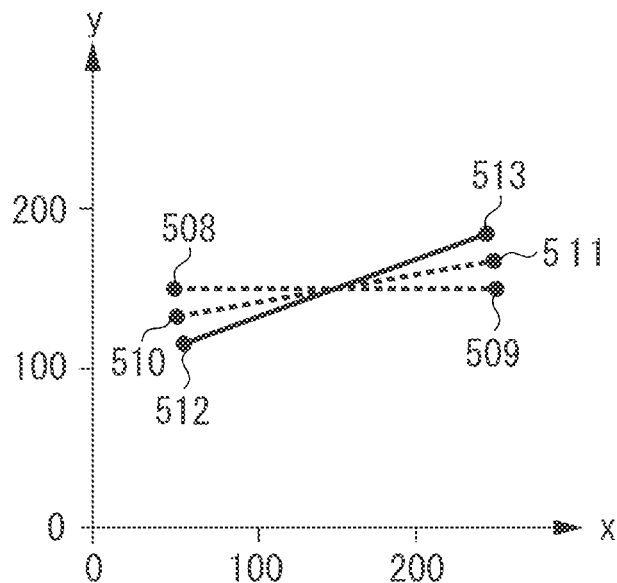

FIG. 5C illustrates a touch point 512 (ID=0) and a touch point 513 (ID=1) detected when the user has moved the touch point 510 and the touch point 511 with two fingers. The touch points 512 and 513 correspond to the information of the detection numbers 5 and 6 stored in table illustrated in FIG. 4A. The information processing apparatus 100 starts the processing of the flowchart illustrated in FIG. 2 at the time when the touch point 513 (detection number 6) has been detected, as described below.

First, in step S201, detection unit 111 allocates the detection number 6 to the touch point 513 and information representing the touch point 513 (i.e., touch event="MOVE", x coordinate=244, and y coordinate=184) in association with ID=1. In this case, as the touch event is "MOVE", the touch point 511 is a touch point having been moved (YES in step S202). Therefore, the distance acquisition unit 112 determines that the detected touch points are a pair of touch points corresponding to ID=0 and ID=1 (YES in step S203). Next, in step S204, the distance acquisition unit 112 acquires the distance D between two touch points based on the coordinate information of the touch point 512 and the touch point 513. According to the example illustrated in FIG. 5C, the distance D between two touch points is 200 dots. Next, in step S311, the setting unit 113 acquires a predetermined angle corresponding to the distance D with reference to the table illustrated in FIG. 4B stored beforehand. In this case, as the distance D is 200 dots, the setting unit 113 acquires 20 degrees as the predetermined angle corresponding to the distance D. Then, in step S312, the setting unit 113 sets the acquired angle of 20 degrees as the threshold value θ. Next, in step S206, the angle acquisition unit 114 acquires the angle α between the straight line connecting touch points at the multi-touch start timing (i.e., the touch point 508 and the touch point 509) and a straight line connecting the latest touch points (i.e., the touch point 512 and the touch point 513). According to the example illustrated in FIG. 5C, the angle acquisition unit 114 obtains 20 degrees as the angle α, which can be calculated using coordinate values of each touch point. Then, the determination unit 115 determines that the angle α (i.e., 20 degrees) is equal to or greater than the threshold value θ (i.e., 20 degrees) (YES in step S207). Accordingly, in step S208, the reception unit 116 receives the rotational operation input to the information processing apparatus 100 and sends a notification to the output control unit 117. In step S209, the output control unit 117 generates an image to be displayed on the touch panel display device 108 by rotating the currently displayed image in a direction following the touch point movement amount by an amount corresponding to the angle α (i.e., 20 degrees), and outputs the generated image to the touch panel display device 108. After the image is output to the touch panel display device 108, the information processing apparatus 100 terminates the multi-touch operation recognizing processing of the flowchart illustrated in FIG. 2.

In the present exemplary embodiment, the information processing apparatus 100 can perform the processing of the flowchart illustrated in FIG. 2 at the time when each touch point of ID=0 (i.e., the touch point 508, the touch point 510, and the touch point 512) is detected, similar to the above-mentioned processing performed for each touch point of ID=1.

Further, in the present exemplary embodiment, the table used to acquire the predetermined angle corresponding to the distance D in step S311 is the example illustrated in FIG. 4B that indicates the relationship between the distance D and the corresponding angle. However, instead of using the table, it is useful to prepare a formula or parameters that can uniquely determine a predetermined angle according to the distance D. In this case, when the distance between two touch points is short, the corresponding angle is set to be a larger value. However, as mentioned above in the present exemplary embodiment, it is useful to set a predetermined angle for an appropriate range of the distance D. In the table illustrated in FIG. 4B, the predetermined angle to be set when the distance D between two touch points is the distance i is greater than the angle to be set for the distance k that is longer than the distance i. As mentioned above, the information processing apparatus 100 uses the predetermined angle variable depending on the distance between two touch points as an angular threshold value to be referred to in recognizing an input rotational operation. In other words, the information processing apparatus 100 can set an appropriate threshold value regardless of the magnitude of the distance between two touch points. Thus, even when the distance between two touch points is short, the information processing apparatus 100 can prevent a currently displayed image from being erroneously rotated contrary to the intent of a user.

Further, in the present exemplary embodiment, the rotational angle of a currently displayed image to be rotated in response to an input rotational operation is set to coincide with the angle $\alpha$. The above-mentioned setting is useful to realize an intuitive multi-touch operation because a user can feel as if the user could directly move the currently displayed image with fingers. However, the rotational angle of the currently displayed image is not limited to the above-mentioned example. For example, it is useful to rotate the currently displayed image in a stepwise fashion (e.g., five steps). For example, in this case, the output control unit 117 rotates the currently displayed image 20 degrees relative to the initial display state if the angle $\alpha$ is in a range of 20 to 24 degrees and rotates 25 degrees if the angle $\alpha$ is in a range of 25 to 29 degrees.

As mentioned above, the information processing apparatus 100 according to the present exemplary embodiment sets an angular threshold value, which can be referred to in determining whether a rotational operation has been input, based on the distance between two touch points detected at predetermined timing. Further, if the rotational angle of a straight line connecting a plurality of touch points exceeds a threshold value having been set beforehand, the information processing apparatus 100 recognizes that a rotational operation has been input based on a touch point movement. In this case, a threshold value to be set by the information processing apparatus 100 when the distance between two touch points is short is greater than a value to be set when the distance between these touch points is long. The above-mentioned setting is useful to prevent a currently displayed image from being erroneously rotated contrary to the intent of a user, regardless of the distance between two touch points.

In the present exemplary embodiment, the threshold value to be referred to in recognizing an input rotational operation is set to be a larger value when the distance between two touch points becomes shorter. Alternatively, it is useful to cancel the rotational operation if the distance between two touch points is shorter than a predetermined minimum value. Such a setting is employable, for example, in a specific environment (e.g., when the size of the display unit is small) to prevent a currently displayed image from being erroneously rotated contrary to the intent of a user.

In the first exemplary embodiment, the information processing apparatus 100 sets the angular threshold value, which can be referred to in determining whether a rotational operation has been input, based on the distance between two touch points that cooperatively constitute a multi-touch. In this case, setting a greater angle as the threshold value to be referred to in recognizing an input rotational operation when the distance between two touch points is short is useful to prevent a currently displayed image from being erroneously rotated contrary to the intent of a user, regardless of the distance between touch points. However, in this case, if securing a sufficient distance between two touch points is difficult, the operability may deteriorate because of difficulty in recognizing an input rotational operation. To solve such a problem, it is useful to occasionally change the threshold value $\theta$ setting method in such a way as to prevent a rotational operation from being erroneously recognized, as described in the following modification examples.

First, as a modification example 1 of the first exemplary embodiment, the information processing apparatus 100 can set the threshold value $\theta$ based on the size of a range (hereinafter, referred to as "input area") that enables the touch panel display device 108 (i.e., the input apparatus) to detect a user touch operation as well as based on the distance D between two touch points. More specifically, the information processing apparatus 100 sets the threshold value $\theta$ to be a small angle when the input area size is small. Thus, even in a case where the screen size is too small to set a sufficient distance between two touch points, the information processing apparatus 100 can prevent the operability from deteriorating in a rotational operation.

The information processing apparatus 100 according to the modification example 1 of the first exemplary embodiment has a hardware configuration that is similar to that of the configuration described in the first exemplary embodiment with reference to FIG. 1A, and, therefore, redundant description thereof will be avoided.

Figure 6A:
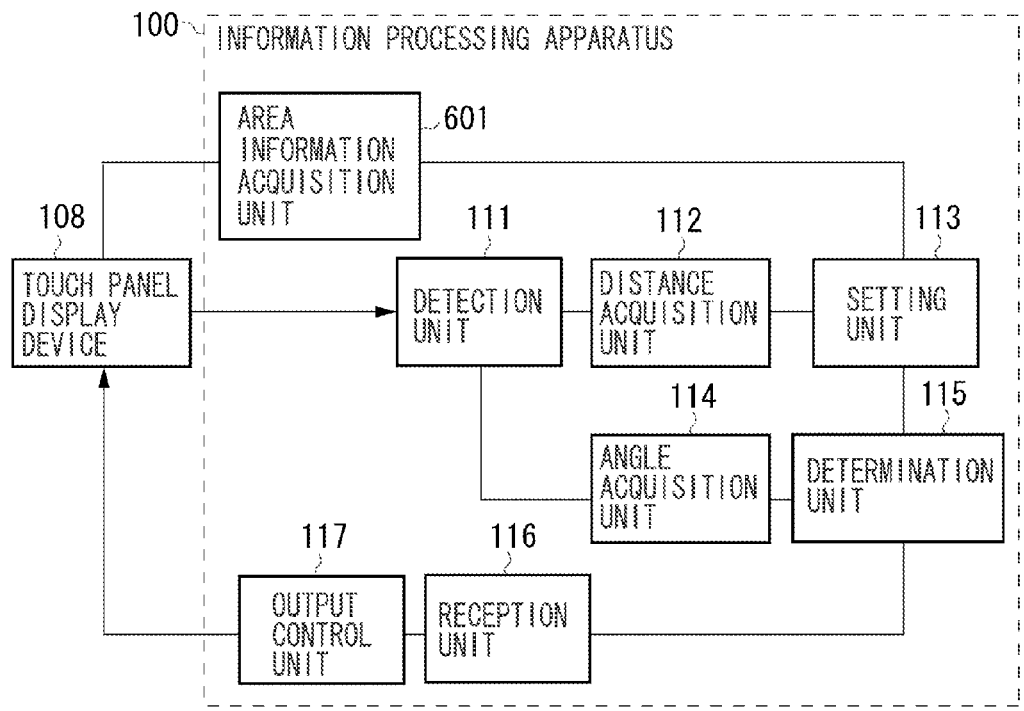
FIGS. 6A, 6B, and 6C are block diagrams each illustrating another functional configuration of the information processing apparatus.

FIG. 6A is a block diagram illustrating a functional configuration of the information processing apparatus 100 according to the present exemplary embodiment. The functional configuration illustrated in FIG. 6A is different from the configuration illustrated in FIG. 1B in that an area information acquisition unit 601 is additionally provided. The area information acquisition unit 601 can acquire an input area size detected by the detection unit 111 based on the magnitude and resolution of the display device screen acquired via the touch panel display device 108 and the input interface 105 as well as based on touch panel driver information. It is presumed that the input area size is variable depending on not only a hardware size of the touch panel display device 108 connected to or provided in the information processing apparatus 100 but also a launched application and display contents of the display device. The rest of the functional configuration is similar to the configuration described in the first exemplary embodiment and, therefore, redundant description thereof will be avoided.

Figure 7A:
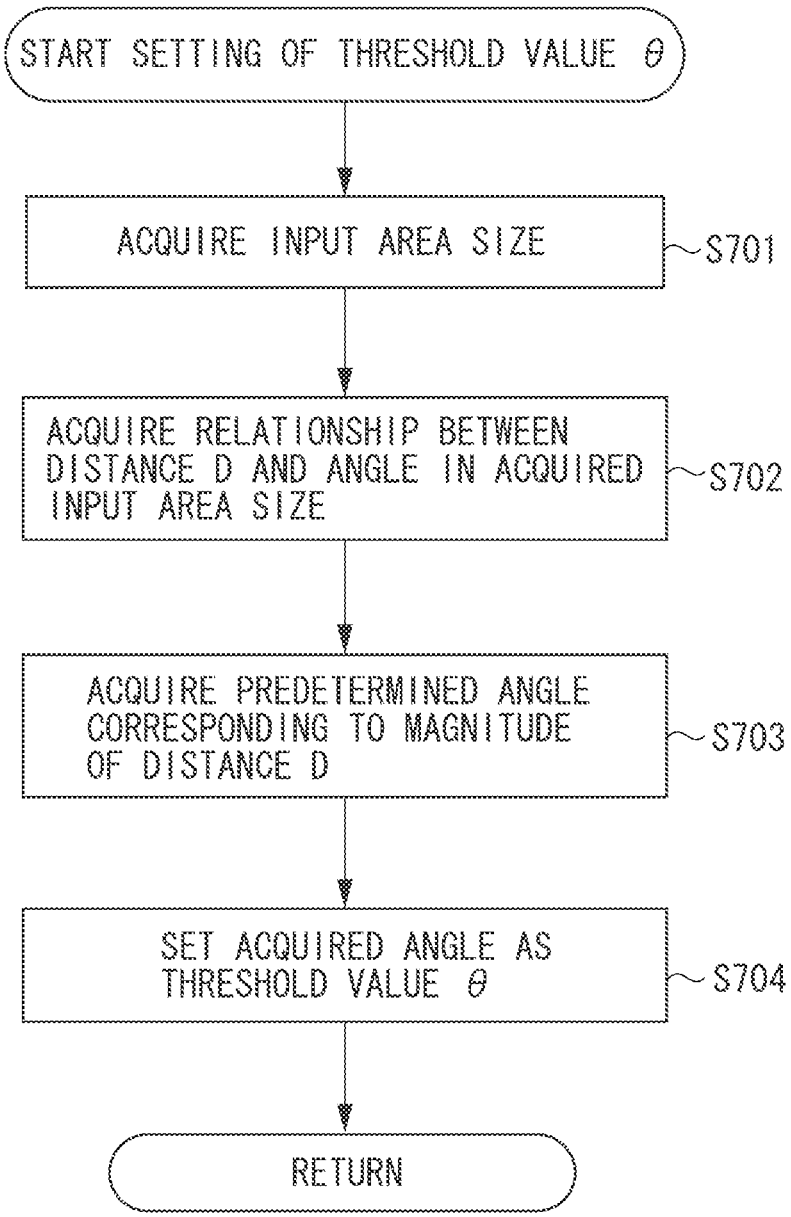

In the modification example 1 of the first exemplary embodiment, the information processing apparatus 100 can also perform multi-touch operation recognizing processing according to the flowchart illustrated in FIG. 2, although the information processing apparatus 100 sets the threshold value θ according to a flowchart illustrated in FIG. 7A in step S205 of FIG. 2.

First, in step S701, the area information acquisition unit 601 acquires an input area size that enables the touch panel display device 108 and the input interface 105 to detect a user touch operation.

In step S702, the setting unit 113 acquires a relationship between the distance D and a corresponding angle with respect to the input area size acquired in step S701. In the modification example of the first exemplary embodiment, it is presumed that a plurality of tables each indicating a relationship between the magnitude of the distance D and a corresponding predetermined angle is stored beforehand in the HD 104. Each table is associated with a corresponding input area size. More specifically, in the modification example 1 of the first exemplary embodiment, if the distance D is shorter, the angle associated with the distance D is set to be larger. If the input area size is smaller, the angle associated with the same distance D is set to be smaller. In step S702, the setting unit 113 acquires a table corresponding to the input area size acquired in step S701 and uses the table loaded into the RAM 103.

In step S703, the setting unit 113 acquires a predetermined angle associated with the magnitude of the distance D acquired by the distance acquisition unit 112 in step S204 with reference to the acquired corresponding relationship.

In step S704, the setting unit 113 sets the angle acquired in step S703 as the threshold value θ. When the setting of the threshold value θ is completed, the operation returns to the main processing (i.e., user multi-touch operation recognizing processing).

The remaining processing of the flowchart illustrated in FIG. 2 is similar to that described in the first exemplary embodiment.

In the present exemplary embodiment, differences between the present exemplary embodiment and the first exemplary embodiment are described below with reference to FIGS. 5A to 5D. FIGS. 4B and 4C illustrate tables each indicating a relationship between the magnitude of the distance D and a corresponding predetermined angle, which are stored in the HD 104. In the present exemplary embodiment, it is presumed that the information processing apparatus 100 uses the table illustrated in FIG. 4B if the input area size acquired by the area information acquisition unit 601 is 500 dots or more in both the x-axis direction and the y-axis direction and uses the table illustrated in FIG. 4C if the size is less than 500 dots in both the x-axis direction and the y-axis direction.

Similar to the first exemplary embodiment, FIG. 5B is a graph illustrating the positional transition of the touch points 508 to 511 (i.e., the touch points corresponding to the detection numbers 1 to 4) on the x-y plane, which have been detected when a user has moved two fingers on the touch panel. The information processing apparatus 100 performs processing of steps S201 to S203 as described in the first exemplary embodiment. In step S204, the distance acquisition unit 112 acquires the distance D (i.e., 200 dots) between the touch point 510 and the touch point 511. Next, in step S701, the area information acquisition unit 601 acquires information including the input area size from the touch panel display device 108. In this case, it is presumed that the obtained information indicates that the maximum x-coordinate value of a detectable touch point is 300 dots and the maximum y-coordinate value is 300 dots. Accordingly, in step S702, the setting unit 113 loads the table illustrated in FIG. 4C into the RAM 103. Then, in step S703, the setting unit 113 acquires a predetermined angle corresponding to the distance D acquired in step S204. In this case, the distance D is 200 dots and, therefore, the setting unit 113 sets 10 degrees as the predetermined angle. In step S704, the setting unit 113 sets 10 degrees as the threshold value θ. Similar to the first exemplary embodiment, in step S206, the angle acquisition unit 114 acquires the angle α (i.e., 10 degrees) between the straight line connecting the touch point 508 and the touch point 509 and the straight line connecting the touch point 510 and the touch point 511. Accordingly, the determination unit 115 determines that the angle α (i.e., 10 degrees) is equal to or greater than the threshold value θ (i.e., 10 degrees) (YES in step S207). Thus, in step S208, the reception unit 116 receives the rotational operation input to the information processing apparatus 100 and sends a notification to the output control unit 117. The output control unit 117 generates an image to be displayed on the touch panel display device 108 by rotating the currently displayed image in a direction following the touch point movement amount by an amount corresponding to the angle α (i.e., 10 degrees), and outputs the generated image to the touch panel display device 108. After the image is output to the touch panel display device 108, the information processing apparatus 100 terminates the multi-touch operation recognizing processing of the flowchart illustrated in FIG. 2.

As mentioned above, in the modification example 1 of the first exemplary embodiment, the information processing apparatus 100 sets the threshold value θ based on the input area size (in which the touch panel display device 108 can detect a user touch operation) in addition to the distance D. Accordingly, in a case where a user performs a multi-touch operation in a state where the user cannot sufficiently increase the distance between two touch points, the information processing apparatus 100 does not erroneously recognize an input rotational operation. More specifically, when the screen size of the equipped touch panel is small, or when the input area range is narrowed using an application function, the information processing apparatus 100 can prevent the operability from deteriorating in the multi-touch operation.

Next, as a modification example 2 of the first exemplary embodiment, the information processing apparatus 100 can set the threshold value θ based on the size of an object being multi-touched by a user in an image currently displayed on the display device as well as based on the distance D between two touch points. More specifically, the information processing apparatus 100 sets the threshold value θ to be a small angle when the object size is small. Thus, even in a case where the object size is too small to set a sufficient distance between two touch points to perform a multi-touch operation to rotate the object, the information processing apparatus 100 can prevent the operability from deteriorating in a rotational operation.

The information processing apparatus 100 according to the modification example 2 of the first exemplary embodiment has a hardware configuration that is similar to that described in the first exemplary embodiment with reference to FIG. 1A and, therefore, redundant description thereof will be avoided.

Figure 6B:
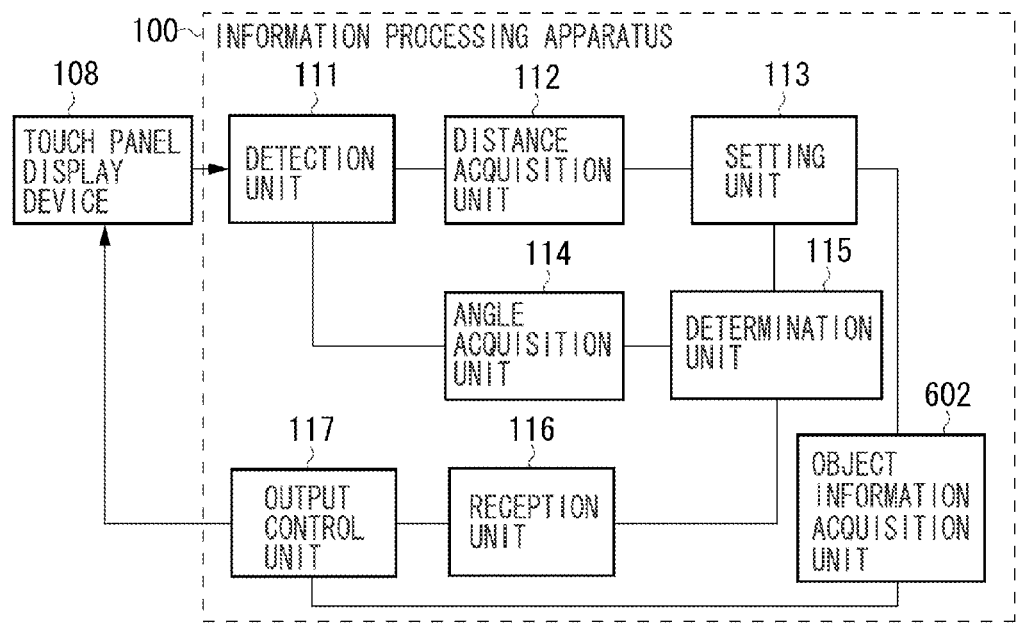

Further, FIG. 6B illustrates a functional configuration of the information processing apparatus 100 according to the present exemplary embodiment. The functional configuration illustrated in FIG. 6B is different from the configuration illustrated FIG. 1B in that an object information acquisition unit 602 is additionally provided. The object information acquisition unit 602 can identify an object that is present at the touch point position detected by the detection unit 111, based on the information including the currently displayed image output to the touch panel display device 108 by the output control unit 117 and acquires information indicating the object size. The rest of the functional configuration is similar to that described in the first exemplary embodiment and, therefore, redundant description thereof will be avoided.

In the modification example 2 of the first exemplary embodiment, the information processing apparatus 100 can also perform multi-touch operation recognizing processing according the flowchart illustrated in FIG. 2, although the information processing apparatus 100 sets the threshold value θ according to a flowchart illustrated in FIG. 7B in step S205 of FIG. 2.

First, in step S711, the object information acquisition unit 602 acquires a size of an object being multi-touched by a user. In this case, the object information acquisition unit 602 obtains information including a currently displayed image, which is output from the output control unit 117, and identifies an object currently displayed at a position corresponding to the coordinate values indicating the detected touch point as an object being multi-touched by the user. If a plurality of objects is present and mutually overlapped with each other, the object information acquisition unit 602 identifies the uppermost one. As mentioned above, the object information acquisition unit 602 identifies an object displayed at the position corresponding to each detected touch point. Then, the object information acquisition unit 602 acquires information indicating the size of the identified object from the output control unit 117 if two objects displayed at different touch points are the same.

In step S712, the setting unit 113 acquires a relationship between the distance D and a corresponding angle with respect to the object size acquired in step S711. In the modification example 2 of the first exemplary embodiment, it is presumed that a plurality of tables each indicating a relationship between the magnitude of the distance D and a corresponding predetermined angle is stored in the HD 104. Each table is associated with a corresponding multi-touched object size. More specifically, in the modification example 2 of the first exemplary embodiment, if the distance D is shorter, the angle associated with the distance D is set to be lager. If the multi-touched object size is smaller, the angle associated with the same distance D is set to be smaller. In step S712, the setting unit 113 acquires a table corresponding to the object size acquired in step S711 and uses the table loaded into the RAM 103.

In step S713, the setting unit 113 acquires a predetermined angle associated with the magnitude of the distance D acquired by the distance acquisition unit 112 in step S204 with reference to the acquired corresponding relationship.

In step S714, the setting unit 113 sets the angle acquired in step S713 as the threshold value θ. When the setting of the threshold value θ is completed, the operation returns to the main processing (i.e., user multi-touch operation recognizing processing).

The remaining processing of the flowchart illustrated in FIG. 2 is similar to that described in the first exemplary embodiment.

The modification example 2 of the first exemplary embodiment is different from the first exemplary embodiment and the modification example 1, as described below. As mentioned above, FIGS. 4B and 4C are the tables each indicating the relationship between the magnitude of the distance D and the corresponding predetermined angle, which are stored in the HD 104. In the present exemplary embodiment, it is presumed that the information processing apparatus 100 uses the table illustrated in FIG. 4B if the object size acquired by the object information acquisition unit 602 is 400 dots or more in both the x-axis direction and the y-axis direction and uses the table illustrated in FIG. 4C if the size is less than 400 dots in both the x-axis direction and the y-axis direction.

Figure 5D:
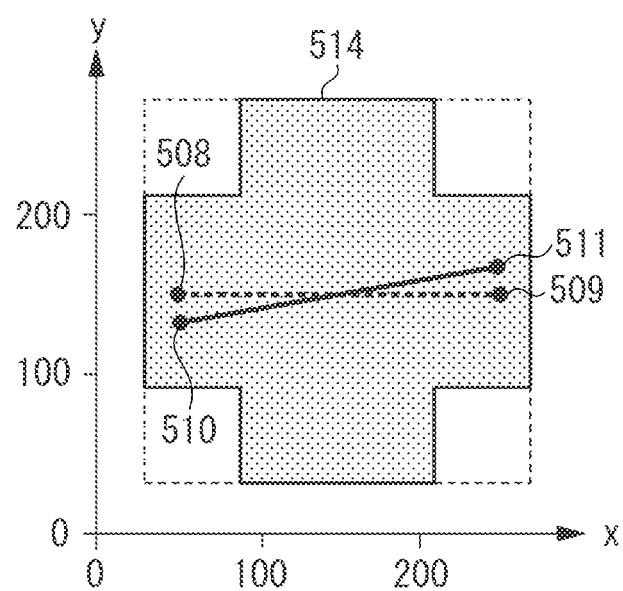

FIG. 5D is a graph illustrating the positional transition of the touch points 508 to 511 (i.e., the touch points corresponding to the detection numbers 1 to 4) on the x-y plane, which have been detected when a user has moved two fingers on the touch panel. More specifically, FIG. 5D corresponds to FIG. 5B described in the first exemplary embodiment and the modification example 1. In FIG. 5D, the touch points 508 to 511 are present in an area of an object 514 being multi-touched by the user. The information processing apparatus 100 performs processing of steps S201 to S203 as described in the first exemplary embodiment. In step S204, the distance acquisition unit 112 acquires the distance D (i.e., 200 dots) between the touch point 510 and the touch point 511. Next, in step S711, the object information acquisition unit 602 acquires information indicating the multi-touched object size based on the currently displayed image output from the output control unit 117. In this case, it is presumed that the acquired information indicates that the maximum width of the object 514 is 240 dots in the x direction and 240 dots in the y direction according to the example illustrated in FIG. 5D. Accordingly, in step S712, the setting unit 113 loads the table illustrated in FIG. 4C into the RAM 103. Then, in step S713, the setting unit 113 acquires a predetermined angle corresponding to the distance D acquired in step S204. In this case, the distance D is 200 dots and, therefore, the setting unit 113 sets 10 degrees as the predetermined angle. In step S714, the setting unit 113 sets 10 degrees as the threshold value θ. Similar to the modification example 1 of the first exemplary embodiment, in step S206, the angle acquisition unit 114 acquires the angle α (i.e., 10 degrees) between the straight line connecting the touch point 508 and the touch point 509 and the straight line connecting the touch point 510 and the touch point 511. Accordingly, the determination unit 115 determines that the angle α (i.e., 10 degrees) is equal to or greater than the threshold value θ (i.e., 10 degrees) (YES in step S207). Thus, in step S208, the reception unit 116 receives the rotational operation input to the information processing apparatus 100 and sends a notification to the output control unit 117. The output control unit 117 generates an image to be displayed on the touch panel display device 108 by rotating the currently displayed image in a direction following the touch point movement amount by an amount corresponding to the angle α (i.e., 10 degrees), and outputs the generated image to the touch panel display device 108. After the image is output to the touch panel display device 108, the information processing apparatus 100 terminates the multi-touch operation recognizing processing of the flowchart illustrated in FIG. 2.

As mentioned above, in the modification example 2 of the first exemplary embodiment, the information processing apparatus 100 sets the threshold value θ based on the multi-touched object size in addition to the distance D. Accordingly, similar to the modification example 1, in a case where a user performs a multi-touch operation in a state where the user cannot sufficiently increase the distance between two touch points, the information processing apparatus 100 does not erroneously recognize an input rotational operation. More specifically, when the size of an object to be rotated in the multi-touch operation is small, the information processing apparatus 100 can prevent the operability from deteriorating in a rotational operation.

Next, as a modification example 3 of the first exemplary embodiment, the information processing apparatus 100 can set the threshold value θ based on a multi-touched object size ratio as well as based on the distance D and the input area size. More specifically, the information processing apparatus 100 sets the threshold value θ to be a small angle when the input area size is small. Further, as mentioned in the modification example 2 of the first exemplary embodiment, the information processing apparatus 100 sets the threshold value θ to be a small angle when the object size is small. Accordingly, for example, in a case where a multi-touched object is sufficiently large even though the input area size is small, the threshold value θ corresponding to the same distance D is set to be greater compared to that described in the modification example 2. Accordingly, the modification example 3 of the first exemplary embodiment is effectively applicable to the information processing apparatus 100 having a comparatively small input area size.

The information processing apparatus 100 according to the modification example 3 of the first exemplary embodiment has a hardware configuration that is similar to that described in the first exemplary embodiment with reference to FIG. 1A. Further, a functional configuration of the information processing apparatus 100 according to the modification example 3 is different from the configuration of the first exemplary embodiment, the modification example 1, and the modification example 2 in that both the area information acquisition unit 601 illustrated in FIG. 6A and the object information acquisition unit 602 illustrated in FIG. 6B are included. The rest of the functional configuration is similar to that described in the first exemplary embodiment and, therefore, redundant description thereof will be avoided.

In the modification example 3 of the first exemplary embodiment, the information processing apparatus 100 can also perform multi-touch operation recognizing processing according to the flowchart illustrated in FIG. 2, although the information processing apparatus 100 sets the threshold value θ according to a flowchart illustrated in FIG. 7C in step S205 of FIG. 2.

First, in step S721, the setting unit 113 acquires a size ratio of an object being multi-touched by a user in the input area. In this case, the area information acquisition unit 601 acquires an input area size that enables the touch panel display device 108 and the input interface 105 to detect a user touch operation. Further, the object information acquisition unit 602 acquires a size of the object being multi-touched by the user. The setting unit 113 calculates the size ratio of the object in the input area based on the acquired input area size and the acquired object size.

In step S722, the setting unit 113 acquires a relationship between the distance D and a corresponding angle with respect to the ratio acquired in step S721. In the modification example 3 of the first exemplary embodiment, it is presumed that a plurality of tables each indicating a relationship between the magnitude of the distance D and a corresponding predetermined angle is stored beforehand in the HD 104. Each table is associated with a size ratio of the object in the input area. More specifically, in the modification example 3 of the first exemplary embodiment, if the distance D is shorter, the angle associated with the distance D is set to be larger. If the size ratio of the object in the input area is larger, the associated angle is set to be greater. In step S722, the setting unit 113 acquires a table corresponding to the ratio acquired in step S721 and uses the table loaded into the RAM 103.

In step S723, the setting unit 113 acquires a predetermined angle associated with the magnitude of the distance D acquired by the distance acquisition unit 112 in step S204, with reference to the acquired corresponding relationship.

In step S724, the setting unit 113 sets the angle acquired in step S723 as the threshold value θ. When the setting of the threshold value θ is completed, the operation returns to the main processing (i.e., user multi-touch operation recognizing processing).

As mentioned above, according to the modification example 3 of the first exemplary embodiment, the information processing apparatus 100 changes the threshold value θ based on the distance D and the size ratio of the multi-touched object in the input area. Accordingly, the information processing apparatus 100 can accurately recognize a multi-touch operation that may be erroneously detected depending on the touch panel display device 108 and currently displayed image contents. More specifically, if an object to be rotated in a multi-touch operation has a sufficiently large size even if the touch operation detectable input area size is small, the apparatus according to the modification example 3 can set a greater angular threshold value to recognize the rotational operation. Thus, the information processing apparatus 100 can prevent a currently displayed image from being erroneously rotated contrary to the intent of a user without deteriorating the operability in the rotational operation.

Next, as a modification example 4 of the first exemplary embodiment, the information processing apparatus 100 can set the threshold value θ based on the size of a user hand used in a multi-touch operation as well as based on the distance D between two touch points. More specifically, the information processing apparatus 100 sets the threshold value θ to be a small angle when the user hand is small. Accordingly, for example, in a case where the user is a child whose hand is too small to secure a sufficiently large distance between two touch points, the information processing apparatus 100 can prevent the operability from deteriorating in the rotational operation.

The information processing apparatus 100 according to the modification example 4 of the first exemplary embodiment has a hardware configuration that is similar to that described in the first exemplary embodiment with reference to FIG. 1A.

Figure 6C:
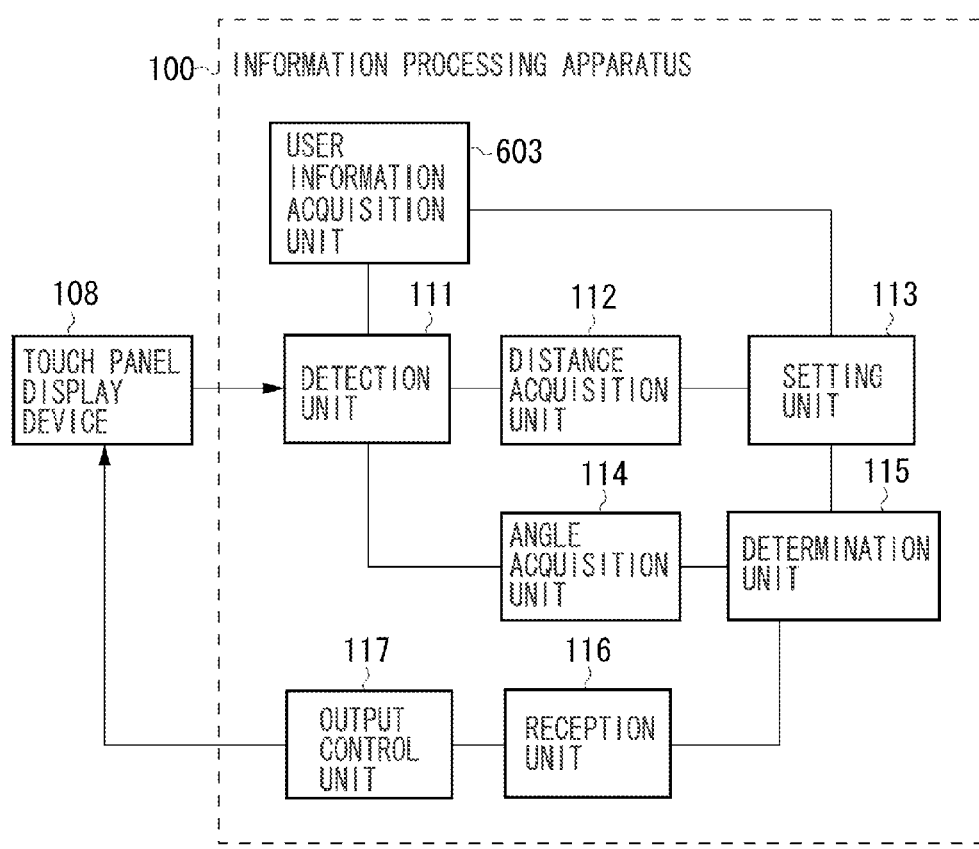

FIG. 6C is a block diagram illustrating a functional configuration of the information processing apparatus 100 according to the modification example 3 of the first exemplary embodiment. The functional configuration illustrated in FIG. 6C is different from the configuration illustrated in FIG. 1 in that a user information acquisition unit 603 is additionally provided.

Figure 8A:
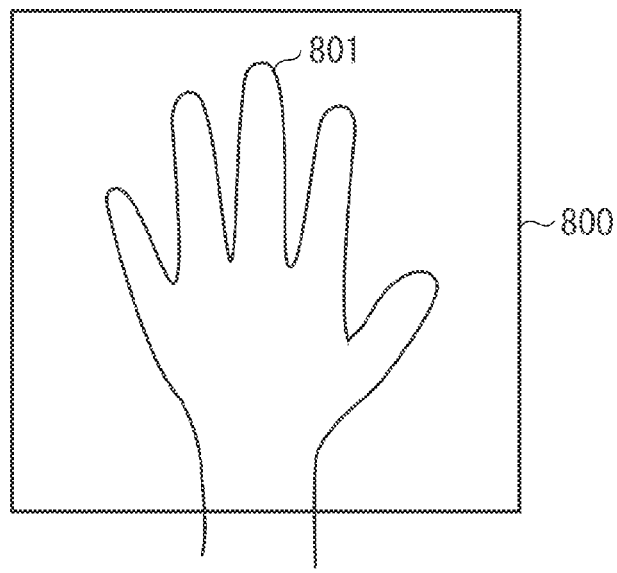
FIGS. 8A, 8B, and 8C illustrate an example of user hand size acquisition method.
Figure 8B:
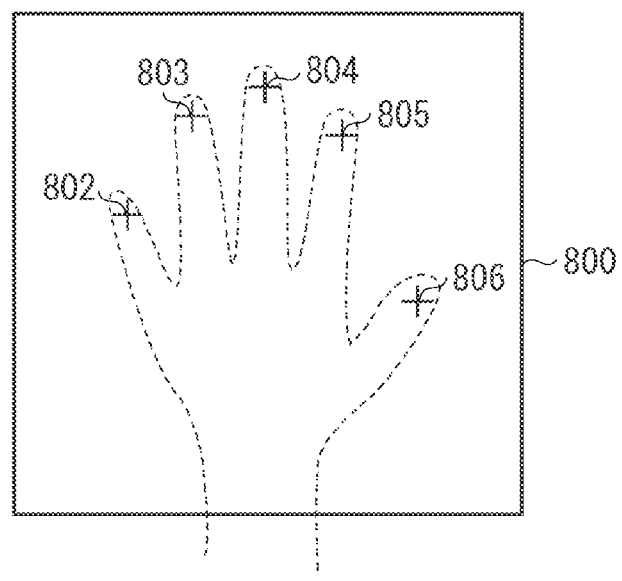
Figure 8C:
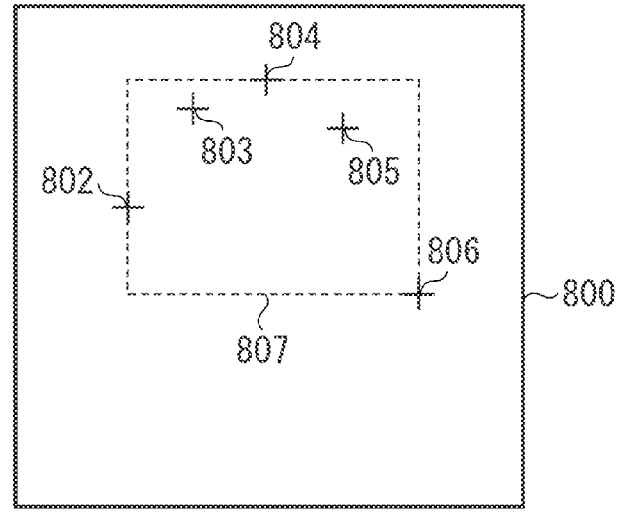

The user information acquisition unit 603 can acquire a user hand size with reference to positional information of a plurality of touch points acquired by the detection unit 111. An example of hand size acquisition method is described below. In the modification example 4 of the first exemplary embodiment, it is presumed that each user can register user hand size to the information processing apparatus 100 and user information including the registered user hand size is stored beforehand in an appropriate storage device (e.g., the HD 104). When user hand size information is required to recognize a multi-touch operation, the information processing apparatus 100 can read and use the information stored in the storage device. An example of hand size registration processing includes causing a user to place a hand and take a regulatory pose in an input area of the touch panel display device 108 and acquiring positional information that indicates the position of each fingertip of the user. FIG. 8A illustrates a stationary state of a hand 801 placed in an input area 800 of the touch panel display device 108. In the present exemplary embodiment, it is presumed that the regulatory pose determined beforehand for the information processing apparatus 100 is widely stretching a hand to touch the input area 800 with five fingertips. Accordingly, as illustrated in FIG. 8B, the detection unit 111 can detect a plurality of touch points 802 to 806 that correspond to five fingers of the user. Then, the user information acquisition unit 603 registers information indicating a minimum rectangular area size that involves all of the detected touch points as user hand size information. A rectangle 807 illustrated in FIG. 8C is a rectangular area that indicating the user hand size. The rest of the functional configuration is similar to that described in the first exemplary embodiment or any one of the modification examples 1 to 3 and, therefore, redundant description thereof will be avoided. However, the hand size acquisition method is not limited to acquiring the positional information of five fingers. For example, as a regulatory pose, it may be useful to cause a user to touch the input area with only two fingers (e.g., a pair of a forefinger and a middle finger or a pair of a thumb and a forefinger).

Figure 7D:
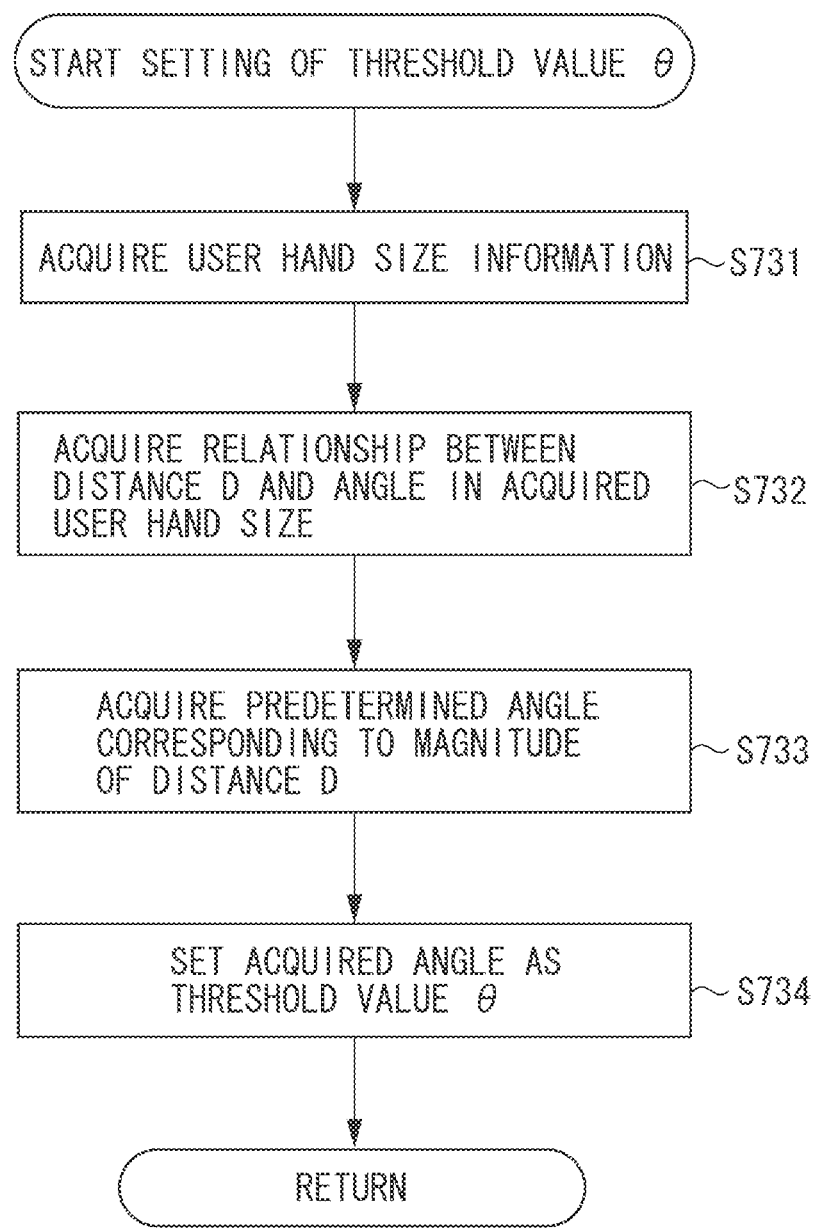

In the modification example 4 of the first exemplary embodiment, the information processing apparatus 100 can perform multi-touch operation recognizing processing according to the flowchart illustrated in FIG. 2, although the information processing apparatus 100 sets the threshold value $\theta$ according to a flowchart illustrated in FIG. 7D in step S205 of FIG. 2.

First, in step S731, the user information acquisition unit 603 acquires user hand size information stored in an appropriate storage device (e.g., the HD 104).

In step S732, the setting unit 113 acquires a relationship between the distance D and a corresponding angle with respect to the user hand size acquired in step S731. In the modification example 4 of the first exemplary embodiment, it is presumed that a plurality of tables each indicating a relationship between the magnitude of the distance D and a corresponding predetermined angle is stored beforehand in the HD 104. Each table is associated with a user hand size. More specifically, in the modification example 4 of the first exemplary embodiment, if the distance D is shorter, the angle associated with the distance D is set to be larger. If the user hand is smaller, the associated angle is set to be smaller. It is presumed that in step S732 the setting unit 113 acquires a table corresponding to the user hand size information acquired in step S731 and uses the table loaded into the RAM 103.

In step S733, the setting unit 113 acquires a predetermined angle associated with the magnitude of the distance D acquired by the distance acquisition unit 112 in step S204, with reference to the acquired corresponding relationship.

In step S734, the setting unit 113 sets the angle acquired in step S733 as the threshold value $\theta$. When the setting of the threshold value $\theta$ is completed, the operation returns to the main processing (i.e., user multi-touch operation recognizing processing).

As mentioned above, according to the modification example 4 of the first exemplary embodiment, the information processing apparatus 100 sets the threshold value $\theta$ based on the user hand size in addition to the distance D. Accordingly, in a case where a user performs a multi-touch operation in a state where the user cannot sufficiently increase the distance between two touch points, the information processing apparatus 100 does not erroneously recognize an input rotational operation. More specifically, when the user hand is small, the information processing apparatus 100 can prevent the operability from deteriorating in the rotational operation.

It is useful to combine a part or the whole of the above-mentioned four modification examples (i.e., the modification example 1 to the modification example 4) of the first exemplary embodiment. Even in such a modification, the information processing apparatus 100 can prevent the operability from deteriorating in the rotational operation when a user performs a multi-touch operation in a state where the user cannot sufficiently increase the distance between two touch points.

In the first exemplary embodiment, the information processing apparatus 100 sets the angular threshold value $\theta$ to be referred to in recognizing an input rotational operation based on the distance between two touch points that cooperatively constitute a multi-touch operation in such a way as to prevent a currently displayed image from being erroneously rotated contrary to the intent of a user. In a second exemplary embodiment, if the angle $\alpha$ between a straight line connecting two touch points before movement and a straight line connecting two touch points after movement is less than the threshold value $\theta$, the information processing apparatus 100 determines whether a multi-touch operation that does not cause any rotation of a currently displayed image has been input. Thus, in a case where a user does not intend to perform a multi-touch operation causing a currently displayed image to rotate around its rotational axis, the information processing apparatus 100 can reduce the possibility of erroneously recognizing an input operational operation, regardless of the distance between touch points.

The information processing apparatus 100 according to the second exemplary embodiment has a hardware configuration and a functional configuration that are similar to those described in the first exemplary embodiment with reference to FIGS. 1A and 1B and, therefore, redundant description thereof will be avoided.

Figure 9:
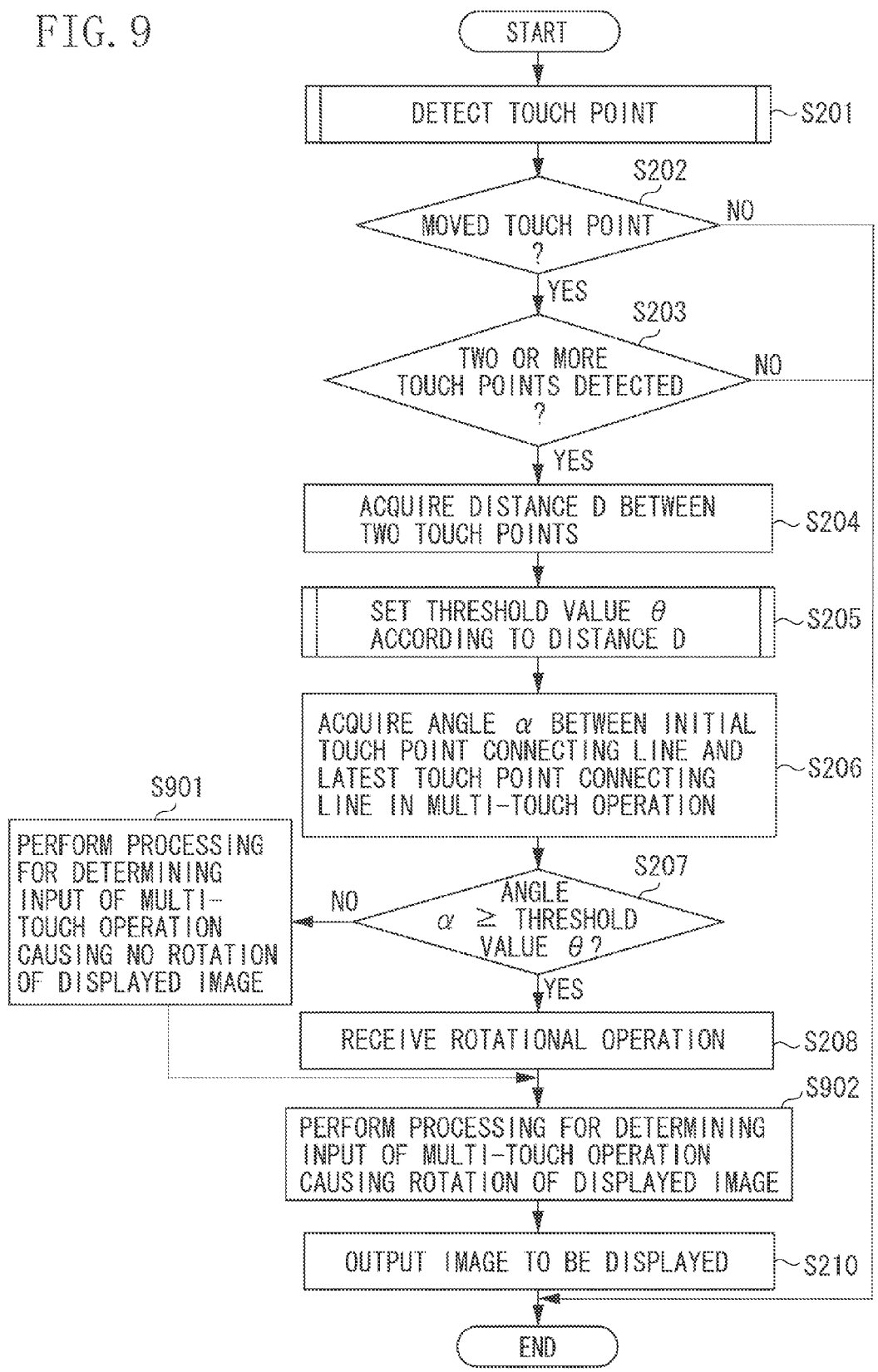
FIG. 9 is a flowchart illustrating another multi-touch operation recognizing processing.

In the second exemplary embodiment, the information processing apparatus 100 performs multi-touch operation recognizing processing according to a flowchart illustrated in FIG. 9. The flowchart illustrated in FIG. 9 is different from the flowchart illustrated in FIG. 2 in including the processing to be additionally executed in steps S901 and S902. The remaining steps are similar to those described in the first exemplary embodiment and, therefore, redundant description thereof will be avoided.

In the second exemplary embodiment, if it is determined that the angle $\alpha$ is less than the threshold value $\theta$ (NO in step S207), the operation proceeds to step S901. In step S901, the information processing apparatus 100 performs processing for determining whether a multi-touch operation causing no rotation of the currently displayed image has been input. The multi-touch operation to be determined in this case is an operation determined beforehand as not causing any rotation of a currently displayed image, which can be determined by an application or a function that can be executed by the information processing apparatus 100. For example, when a user browses photos, the information processing apparatus 100 can determine whether a multi-drag operation has been input to call and display a specific image by checking if two touch points are moved in the same direction while keeping a substantially constant distance between the two touch points. If it is determined that the multi-touch operation causing no rotation of the currently displayed image has been input, the reception unit 116 receives the input operation and sends parameters necessary to update the currently displayed image to the output control unit 117. As mentioned above, the multi-drag operation in the present exemplary embodiment intends to call and display a specific image. Therefore, the reception unit 116 sends information indicating an image to be displayed to the output control unit 117.

If there is a plurality of multi-touch operations, the same number of input determination processing can be performed in series or parallel for respective multi-touch operations in step S901.

In the present exemplary embodiment, the information processing apparatus 100 performs processing for determining whether the multi-touch operation causing no rotation of the currently displayed image has been input if it is determined that the angle α is less than the threshold value θ (see step S901). However, in a case where another determination method is employed and if it is determined that an operation that causes a rotation of a currently displayed image is not input, the information processing apparatus 100 can perform the processing of step S901 to determine whether a multi-touch operation causing no rotation of the currently displayed image has been input. For example, first, the determination unit 115 acquires a movement distance between two touch points before and after the movement. If it is determined that the acquired movement distance is longer than a predetermined distance, the information processing apparatus 100 can finally determines that there is not any operation that causes a rotation of the currently displayed image. Subsequently, the information processing apparatus 100 performs the processing of step S901 to determine whether a multi-touch operation causing no rotation of the currently displayed image has been input. Depending on the determination result, the reception unit 116 receives the multi-touch operation causing no rotation of the currently displayed image. The above-mentioned method is effectively employable to discriminate a specific operation that causes a large touch point movement (e.g., multi-drag operation or pinch operation) from a general rotational operation. Performing stepwise determination processing as mentioned above is useful to efficiently determine an input of an operation that causes a rotation of a currently displayed image and distinctively receive a plurality of multi-touch operations.

In step S902, the information processing apparatus 100 performs processing for determining whether a multi-touch operation causing a rotation of a currently displayed image has been input. The multi-touch operation to be determined in this case can be determined by an application or a function that can be executed by the information processing apparatus 100. For example, in a case where a map is displayed on the display device, the information processing apparatus 100 can determine whether the input operation is a pinch operation that enlarges or reduces a currently displayed image based on a change in the distance D between two touch points before and after the movement of at least one touch point. If it is determined that the multi-touch operation causing a rotation of the currently displayed image has been input, the reception unit 116 receives the input operation and sends parameters necessary to update the currently displayed image to the output control unit 117. If the input operation is a pinch operation, the parameters to be sent from the reception unit 116 to the output control unit 117 include an enlargement rare to change the size of the displayed image. If there is a plurality of multi-touch operations, the same number of input determination processing can be performed in series or parallel for respective multi-touch operations in step S902.

Even in the second exemplary embodiment, when the information processing apparatus 100 sets the threshold value θ based on the distance D, it is useful to use the modification example in which the input area size of the touch panel is taken into consideration. In this case, the information processing apparatus 100 can perform the threshold value θ setting processing (see step S205) according to the flowchart illustrated in FIG. 7A. Similar to the modification example 1 of the first exemplary embodiment, if the distance D between two touch points remains the same, the threshold value θ to be set is a smaller angle when the input area size is smaller. Thus, even in a case where a user performs a rotational operation in a state where the user cannot sufficiently increase the distance between two touch points because the input area is small, the information processing apparatus 100 can adequately maintain the operability in the rotational operation.

Similarly, even in the second exemplary embodiment, when the information processing apparatus 100 sets the threshold value θ based on the distance D, it is useful to use the modification example in which the multi-touched object size is taken into consideration. In this case, the information processing apparatus 100 can perform the threshold value θ setting processing (see step S205) according to the flowchart illustrated in FIG. 7B. Similar to the modification example 2 of the first exemplary embodiment, if the distance D between two touch points remains the same, the threshold value θ to be set is a smaller angle when the multi-touched object size is smaller. Thus, even in a case where a user performs a rotational operation in a state where the user cannot sufficiently increase the distance between two touch points because the operation target object is small, the information processing apparatus 100 can adequately maintain the operability in the rotational operation.

Similarly, even in the second exemplary embodiment, when the information processing apparatus 100 sets the threshold value θ based on the distance D, it is useful to uses the modification example in which the size ratio of the multi-touched object in the input area is taken into consideration. In this case, the information processing apparatus 100 can perform the threshold value θ setting processing (see step S205) according to the flowchart illustrated in FIG. 7C. Similar to the modification example 3 of the first exemplary embodiment, if the distance D between two touch points remains the same, the threshold value θ to be set is a larger angle when the size ratio of the multi-touched object in the input area is large. Thus, even in a case where a user performs a rotational operation in a state where the user cannot sufficiently increase the distance between two touch points, the information processing apparatus 100 can adequately maintain the operability in the rotational operation.

Similarly, even in the second exemplary embodiment, when the information processing apparatus 100 sets the threshold value θ based on the distance D, it is useful to uses the modification example in which the user hand size is taken into consideration. In this case, the information processing apparatus 100 can perform the threshold value θ setting processing (see step S205) according to the flowchart illustrated in FIG. 7D. Similar to the modification example 4 of the first exemplary embodiment, if the distance D between two touch points remains the same, the threshold value θ to be set is a smaller angle when the user hand used in the operation is smaller. Thus, even in a case where a user performs a rotational operation in a state where the user cannot sufficiently increase the distance between two touch points because the user hand is small, the information processing apparatus 100 can adequately maintain the operability in the rotational operation.

The above-mentioned four modification examples of the first exemplary embodiment are combinable at least partly. Even in such a modification example, the information processing apparatus 100 can adequately maintain the operability in a rotational operation in a case where a user performs the rotational operation in a state where the user cannot sufficiently increase the distance between two touch points.

As mentioned above, the information processing apparatus according to the present exemplary embodiment sets an angular threshold value that is variable depending on the distance between two touch points detected at predetermined timing. The information processing apparatus according to the present exemplary embodiment recognizes an input rotational operation if the rotational angle of a straight line connecting two or more touch points exceeds a set threshold value when at least one touch point has moved. If the rotational angle exceeds the threshold value, the information processing apparatus determines whether a multi-touch operation causing no rotation of a currently displayed image has been input. In this case, if the distance between touch points is short, the information processing apparatus sets a larger angular threshold value compared to that to be set when the distance is longer. Thus, the information processing apparatus can prevent a currently displayed image from being erroneously rotated contrary to the intent of a user, regardless of the magnitude of the distance between touch points.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-092213 filed Apr. 13, 2012, which is hereby incorporated by reference herein in its entirety.

What is claimed is:

1. An information processing apparatus configured to allow a touch operation thereon, the information processing apparatus comprising:
an acquisition unit configured to acquire an angle between a straight line determined by two touch points at a first time point and a straight line determined by two touch points at a second time point;
a setting unit configured to set an angular threshold value based on a distance between the two touch points at the first time point and a size of a target area of the touch operation included in the information processing apparatus; and
a reception unit configured to receive an operational input performed with the two touch points as an operation for rotating an image displayed on a display device in a case where the angle acquired by the acquisition unit is greater than the angular threshold value set by the setting unit,
wherein, the setting unit is configured to set the angular threshold value to a larger value as the distance between the two touch points at the first time point is shorter, and in a case where the distance between the two touch points at the first time point is the same and the size of the target area of the touch operation is different, the setting unit is configured to set the angular threshold value to a smaller value as the size of the target area of the touch operation is smaller.

2. The information processing apparatus according to claim 1, wherein if at least one of the two touch points has moved between the first time point and the second time point, the acquisition unit acquires an angle between a straight line connecting positions of the two touch points at the first time point before the movement and a straight line connecting positions of the two touch points at the second time point after the movement.

3. The information processing apparatus according to claim 1, wherein the predetermined operation is an operation for rotating an image displayed on a display device.

4. The information processing apparatus according to claim 3, wherein the reception unit is configured to receive the operational input performed with the two touch points as an operation for enlarging the image, based on a variation amount between the distance between the two touch points at the first time point and the distance between the two touch points at the second time point.

5. The information processing apparatus according to claim 1, wherein, in case that the distance between the two touch points at the first time point is a distance i, the setting unit is configured to set the angular threshold value to an angle greater than an angle to be set in case that the distance between the two touch points is a distance k that is greater than the distance i.

6. The information processing apparatus according to claim 1, wherein the first time point is when the two touch points have been initially detected, and the second time point is when the two touch points have been finally detected.

7. The information processing apparatus according to claim 3, further comprising a determination unit configured to determine whether a multi-touch operation causing no rotation of the image displayed on the display device has been input if the angle acquired by the acquisition unit is less than the angular threshold value.

8. The information processing apparatus according to claim 7, wherein the determination unit is configured to determine whether at least one of the two touch points has moved in the same direction while maintaining a substantially constant distance between the two touch points if the angle acquired by the acquisition unit is less than the angular threshold value.

9. An information processing apparatus to allow a touch operation thereon, the information processing apparatus comprising:
an acquisition unit configured to acquire an angle between a straight line determined by two touch points at a first time point and a straight line determined by two touch points at a second time point;
a setting unit configured to set an angular threshold value based on a distance between the two touch points at the first time point and a size of an object multi-touched by the two touch points; and a reception unit configured to receive an operational input performed with the two touch points as an operation for rotating an image displayed on a display device in a case where the angle acquired by the acquisition unit is greater than the angular threshold value set by the setting unit, wherein, the setting unit is configured to set the angular threshold value to a larger value as the distance between the two touch points at the first time point is shorter, and in a case where the distance between the two points at the first time point is the same and a size of an object multi-touched by the two points is different, the setting unit is configured to set the angular threshold value to a smaller value as the size of the object multi-touched by the two touch points is smaller.

10. An information processing apparatus to allow a touch operation thereon, the information processing apparatus comprising:

an acquisition unit configured to acquire an angle between a straight line determined by two touch points at a first time point and a straight line determined by two touch points at a second time point;

a setting unit configured to set an angular threshold value based on a distance between the two touch points at the first time point and a size ratio of an object multi-touched by the two touch points to a target area; and a reception unit configured to receive an operational input performed with the two touch points as an operation for rotating an image displayed on a display device in a case where the angle acquired by the acquisition unit is greater than the angular threshold value set by the setting unit, wherein, the setting unit is configured to set the angular threshold value to a larger value as the distance between the two touch points at the first time point is shorter, and in a case where the distance between the two points at the first time point is the same and the size ratio of an object multi-touched by the two points to a target area is different, the setting unit is configured to set the angular threshold value to a larger value as the size ratio of an object multi-touched by the two touch points to a target area is larger.

11. The information processing apparatus according to claim 1, wherein the two touch points constituting the touch operation are selected from three or more touch points constituting the touch operation.

* * * * *